(12) United States Patent
Itoh et al.

(10) Patent No.: US 11,110,933 B2
(45) Date of Patent: Sep. 7, 2021

(54) DRIVING SUPPORT DEVICE, WEARABLE DEVICE, DRIVING SUPPORT SYSTEM, DRIVING SUPPORT METHOD, AND COMPUTER-READABLE RECORDING MEDIUM

(71) Applicant: TOYOTA JIDOSHA KABUSHIKI KAISHA, Toyota (JP)

(72) Inventors: Kazuhiro Itoh, Mishima (JP); Shuntaro Shinohara, Susono (JP); Hiromitsu Metsugi, Toyota (JP); Naoki Aikawa, Fujisawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/705,613

(22) Filed: Dec. 6, 2019

(65) Prior Publication Data

US 2020/0180645 A1 Jun. 11, 2020

(30) Foreign Application Priority Data

Dec. 10, 2018 (JP) .............................. JP2018-231103

(51) Int. Cl.
*B60W 40/09* (2012.01)
*B60W 50/14* (2020.01)
*B60W 40/105* (2012.01)
*G06K 9/00* (2006.01)

(52) U.S. Cl.
CPC .......... *B60W 40/09* (2013.01); *B60W 40/105* (2013.01); *B60W 50/14* (2013.01); *G06K 9/00845* (2013.01); *B60W 2050/146* (2013.01); *B60W 2540/18* (2013.01)

(58) Field of Classification Search
CPC .... B60W 40/09; B60W 40/105; B60W 50/14; G06K 9/00845
USPC .......................................................... 340/438
See application file for complete search history.

(56) References Cited

U.S. PATENT DOCUMENTS

| | | | |
|---|---|---|---|
| 2012/0215403 A1* | 8/2012 | Tengler | B60K 37/06 701/36 |
| 2014/0160249 A1* | 6/2014 | Ro | G06T 7/593 348/47 |
| 2014/0268353 A1* | 9/2014 | Fujimura | G02B 27/01 359/630 |
| 2015/0054951 A1* | 2/2015 | Maytal | G06K 9/00845 348/148 |
| 2015/0339031 A1* | 11/2015 | Zeinstra | G06F 3/04842 715/747 |
| 2017/0217373 A1* | 8/2017 | Naitoh | H04N 5/23293 |
| 2018/0164114 A1* | 6/2018 | Chiu | G06F 3/04817 |
| 2019/0005412 A1* | 1/2019 | Matus | G07C 5/085 |

(Continued)

FOREIGN PATENT DOCUMENTS

| | | |
|---|---|---|
| JP | 2004-197647 A | 7/2004 |
| JP | 2006-347296 A | 12/2006 |
| JP | 2016-041562 A | 3/2016 |

*Primary Examiner* — Kerri L McNally

(74) *Attorney, Agent, or Firm* — Sughrue Mion, PLLC

(57) ABSTRACT

A driving support device includes: a memory; and a processor including hardware, the processor being configured to acquire line-of-sight information about a line of sight of a driver seated in a driver's seat of a vehicle, and output driving support information for supporting driving of the vehicle, onto a visual field of the driver based on the line-of-sight information.

14 Claims, 16 Drawing Sheets

(56) References Cited

U.S. PATENT DOCUMENTS

| | | | |
|---|---|---|---|
| 2019/0009796 A1* | 1/2019 | Fujii | B60W 50/14 |
| 2019/0102636 A1* | 4/2019 | Koravadi | H04N 7/183 |
| 2019/0143815 A1* | 5/2019 | Sato | B60K 35/00 |
| | | | 340/439 |

* cited by examiner

DRIVING SUPPORT DEVICE, WEARABLE DEVICE, DRIVING SUPPORT SYSTEM, DRIVING SUPPORT METHOD, AND COMPUTER-READABLE RECORDING MEDIUM

CROSS-REFERENCE TO RELATED APPLICATION(S)

The present application claims priority to and incorporates by reference the entire contents of Japanese Patent Application No. 2018-231103 filed in Japan on Dec. 10, 2018.

BACKGROUND

1. Technical Field

The present disclosure relates to a driving support device, a wearable device, a driving support system, a driving support method, and a computer-readable recording medium.

2. Related Art

There is known a technology for evaluating a driver's driving operation on a vehicle based on the behavior of the vehicle (see, for example, JP 2006-347296 A). In this technology, based on the behavior such as acceleration of the vehicle, an image for evaluating the driving operation is generated, and the image is displayed on a display screen of a navigation system when the vehicle is traveling or is stopped. Thus, a result of driving operation evaluation is presented to the driver.

SUMMARY

According to JP 2006-347296 A described above, the driver driving the vehicle moves the line of sight from the windshield to the display screen of the navigation system, and thus the safety during the driving is compromised. For this reason, it is desirable to provide a driving support device, a wearable device, a driving support system, a driving support method, and a computer-readable recording medium that can ensure safety during driving.

In some embodiments, a driving support device includes: a memory; and a processor including hardware, the processor being configured to acquire line-of-sight information about a line of sight of a driver seated in a driver's seat of a vehicle, and output driving support information for supporting driving of the vehicle, onto a visual field of the driver based on the line-of-sight information.

In some embodiments, provided is a wearable device configured to bidirectionally communicate with a vehicle, transmit light in a visual field, and virtually display an image on the visual field. The wearable device includes: a line-of-sight sensor configured to detect line-of-sight information about a line of sight of a driver wearing the wearable device; a memory; and a processor including hardware, the processor being configured to output driving support information for supporting driving of the vehicle, onto the visual field of the driver based on the line-of-sight information.

In some embodiments, a driving support system includes: the driving support device; and a wearable device configured to bidirectionally communicate with the driving support device, transmit light in a visual field, and virtually display an image on the visual field. The wearable device includes a line-of-sight sensor configured to detect line-of-sight information about a line of sight of a driver wearing the wearable device, and the processor is configured to output to the wearable device, the driving support information on the visual field of the driver based on the line-of-sight information.

In some embodiments, provided is a driving support method performed by a driving support device. The method includes: acquiring line-of-sight information about a line of sight of a driver seated in a driver's seat of a vehicle; and outputting driving support information for supporting driving of the vehicle, onto a visual field of the driver based on the line-of-sight information read from a memory.

In some embodiments, provided is a non-transitory computer-readable recording medium with an executable program stored thereon. The program causes a driving support device to execute acquiring line-of-sight information about a line of sight of a driver seated in a driver's seat of a vehicle, and outputting driving support information for supporting driving of the vehicle, onto a visual field of the driver based on the line-of-sight information.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Figure 1:
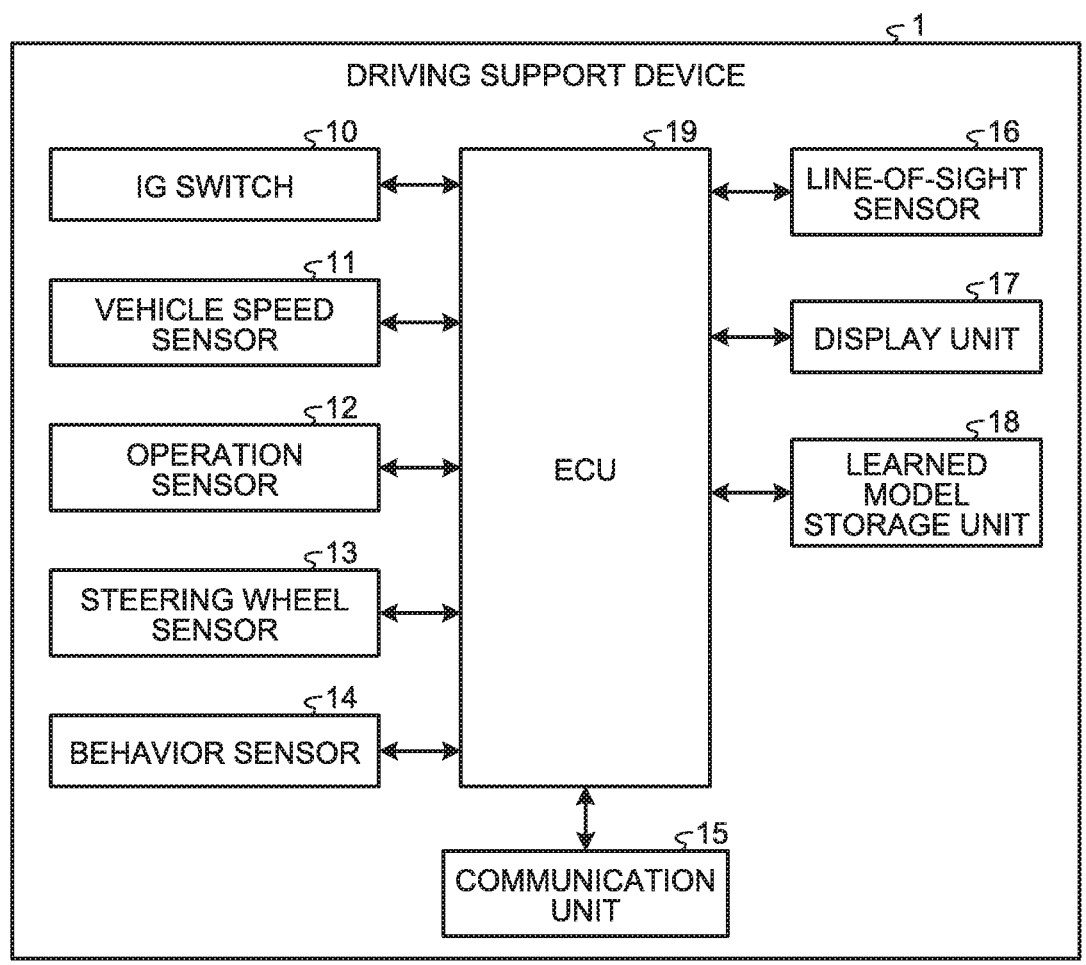
FIG. 1 is a block diagram illustrating a functional configuration of a driving support device installed in a vehicle according to a first embodiment.

Hereinafter, embodiments of the disclosure will be described in detail with reference to the drawings. The disclosure is not limited to the embodiments described below. The following description is given with the same components denoted with the same reference numerals.

First Embodiment

Configuration of Driving Support Device

FIG. 1 is a block diagram illustrating a functional configuration of a driving support device installed in a vehicle according to a first embodiment. A driving support device 1 illustrated in FIG. 1 is installed in a vehicle, and cooperates with other Electronic Control Units (ECUs) installed in the vehicle to support driving of a driver in the vehicle. The driving support device 1 illustrated in FIG. 1 includes an ignition switch 10 (hereinafter referred to as an "IG switch 10"), a vehicle speed sensor 11, an operation sensor 12, a steering wheel sensor 13, a behavior sensor 14, a communication unit 15, a line-of-sight sensor 16, a display unit 17, a learned model storage unit 18, and an ECU 19.

The IG switch 10 receives instructions of start and stop of an electric system such as an engine or a motor. The IG switch 10 starts an IG power supply upon being turned ON, and stops the IG power supply upon being turned OFF.

The vehicle speed sensor 11 detects the vehicle speed while the vehicle is traveling, and outputs a result of the detection to the ECU 19.

The operation sensor 12 detects an operation amount indicating a depression amount of each of an accelerator pedal, a brake pedal and a clutch pedal by the driver, and outputs a result of the detection to the ECU 19.

The steering wheel sensor 13 detects a steering amount of the steering wheel by the driver, and outputs a result of the detection to the ECU 19.

The behavior sensor 14 detects the behavior of the vehicle and outputs a result of the detection to the ECU 19. This behavior of the vehicle includes a pitch rate, a roll rate, a yaw rate, an acceleration in the vertical direction, an acceleration in the lateral direction, an acceleration in the longitudinal direction, and the like. The behavior sensor 14 is formed by using an acceleration sensor, a gyro sensor, and the like.

Under the control of the ECU 19, the communication unit 15 transmits and receives various pieces of information to and from a server (not illustrated), via a base station and a network, according to a predetermined communication standard. Furthermore, the communication unit 15 transmits various pieces of information to and from a wearable device, another vehicle, or a user terminal device which is not illustrated, according to a predetermined communication standard. The communication unit 15 is formed by using a communication module supporting wireless communications. The communication unit 15 may be of a wired or wireless type.

The line-of-sight sensor 16 detects the line of sight of the driver seated in the driver's seat of the vehicle, and outputs a result of the detection to the ECU 19. The line-of-sight sensor 16 is formed by using an optical system, a charge coupled device (CCD) or a complementary metal oxide semiconductor (CMOS), a memory, and a processor having hardware such as a central processing unit (CPU) and a graphics processing unit (GPU). The line-of-sight sensor 16 detects a non-moving part (for example, eye inner corner) of the driver's eyes as a reference point using, for example, a known template matching, and detects a moving part of the eye (for example, iris) as a moving point. The line of sight of the driver is detected based on the positional relationship between the reference point and the moving part. In the first embodiment, the line-of-sight sensor 16 detects the line-of-sight of the driver using a visible camera. However, this should not be construed in a limiting sense, and the line-of-sight of the driver may be detected by an infrared camera. When the line-of-sight sensor 16 is an infrared camera, a reference point (for example, corneal reflex) and a moving point (for example, a pupil) are detected from image data generated by capturing with the infrared camera an image of the driver irradiated with infrared light by an infrared light emitting diode (LED) or the like. Then, the line of sight of the driver is detected based on the positional relationship between the reference point and the moving part.

The display unit 17 is provided on the windshield or the instrument panel of the vehicle, and projects and displays an image, a video, and text information on the windshield, under the control of the ECU 19. The display unit 17 is formed by using, for example, a Head-UP Display (HUD) or the like. Specifically, the display unit 17 is formed by using an image display machine, a diffusion plate, a magnifier, and the like. The image display machine includes a display panel, such as an organic Electro Luminescence (EL) or a liquid crystal, projecting an image. The image projected by the image display machine is formed as an intermediate image on the diffusion plate. The magnifier enlarges the intermediate image formed on the diffusion plate, so that the resultant image is projected on the windshield.

The learned model storage unit 18 stores a learned model as a result of machine learning using traveling data acquired with a plurality of vehicles. Here, the traveling data is data including: the vehicle speed of the vehicle; the operation amount on the accelerator pedal, the brake pedal, and the clutch pedal; the steering amount on the steering wheel; behavior information such as the acceleration of the vehicle; the weather; the traffic condition; and position and gear information about the vehicle. The learned model is a learned model generated based on deep learning using a neural network. Specifically, the learned model is a forward propagation neural network, and has an input layer, an intermediate layer, and an output layer. The input layer includes a plurality of nodes receiving different input parameters. The intermediate layer has a multi-layered structure including a layer with a plurality of nodes that receive an input from the input layer. The output layer receives an output from the intermediate layer, and outputs an output parameter. Each node in the input layer outputs a signal, having a value obtained by multiplying the input parameter by a predetermined weight, to each node in the adjacent intermediate layer. The intermediate layer receives a value obtained by adding a predetermined bias to the output from each node of the input layer. With such a procedure sequentially repeated along the forward direction from the side of the input layer to the side of the output layer, one output parameter is eventually output from the output layer. The machine learning using a neural network with the intermediate layer having a multi-layered structure is called deep learning. In the first embodiment, the input parameter is "the vehicle speed of the vehicle, the operation amount on the accelerator pedal, the brake pedal, the clutch pedal, and the like, the steering amount on the steering wheel, the behavior information such as the acceleration of the vehicle, and the position information of the vehicle". The output parameter is "a recommended operation amount on an operation member, recommended steering amount on the steering wheel, vehicle speed of the vehicle, and traveling line of the vehicle". In addition, storing the learned model means storing information in the learned model such as network parameters and calculation algorithm.

The ECU 19 controls the operation of each component of the driving support device 1. The ECU 19 is formed by using a memory and a processor having hardware which is any of a CPU, a graphics processing unit (GPU), a field programmable gate array (FPGA), a digital signal processing (DSP), an application specific integrated circuit (ASIC), and the like. The ECU 19 outputs driving support information to a region within the driver's visual field based on the line-of-sight information corresponding to the driver's line of sight acquired from the line-of-sight sensor 16. Here, the visual field of the driver, based on a static angle of view, is 100 degrees in each of left and right directions in the horizontal direction, 60 degrees in the upward direction in the vertical direction, and 75 degrees in the downward direction in the vertical direction, from the reference (0 degrees) corresponding to the line of sight of the driver.

Furthermore, the ECU 19 outputs driving support information to a region in the visual field of the driver. This region is a region of an operation member provided to the vehicle, and is in an orthogonal direction orthogonal to the operation member (hereinafter, simply referred to as an "region right above"). Specifically, the ECU 19 inputs the input parameters that are the driver's operation amount on the accelerator pedal acquired from the operation sensor 12 and the vehicle speed of the vehicle acquired from the vehicle speed sensor 11, to the learned model stored in the learned model storage unit 18, and outputs a recommended operation amount on the accelerator pedal which is an output parameter output from the learned model. Then, the ECU 19 outputs the operation amount and the recommended operation amount to the display unit 17 so that the operation amount and the recommended operation amount are projected and displayed as driving support information on the region right above the accelerator pedal.

Furthermore, the ECU 19 inputs the input parameters that are the driver's steering amount on the steering wheel acquired from the steering wheel sensor 13 and the vehicle speed of the vehicle acquired from the vehicle speed sensor 11 to the learned model stored in the learned model storage unit 18, and outputs a recommended steering amount on the steering wheel that is an output parameter output from the learned model. Then, the ECU 19 outputs the steering amount and the recommended steering amount to the display unit 17 so that the steering amount and the recommended steering amount are projected and displayed as driving support information on the region right above the steering wheel.

Furthermore, the ECU 19 outputs driving support information to a region on the driver's line of sight between the driver and the windshield of the vehicle. Specifically, the ECU 19 generates the driving support information based on the behavior information about the vehicle acquired from a behavior sensor 4, and outputs the driving support information to the display unit 17, so that the driving support information is projected and displayed on the region between the driver and the windshield of the vehicle. This line of sight may be within the visual field set to be of a predetermined range (for example, a range of 5 cm×5 cm with the line of sight at the center) based on the line of sight of the driver. In the first embodiment, the ECU 19 functions as a processor.

Processing Executed by Driving Support Device

Figure 2:
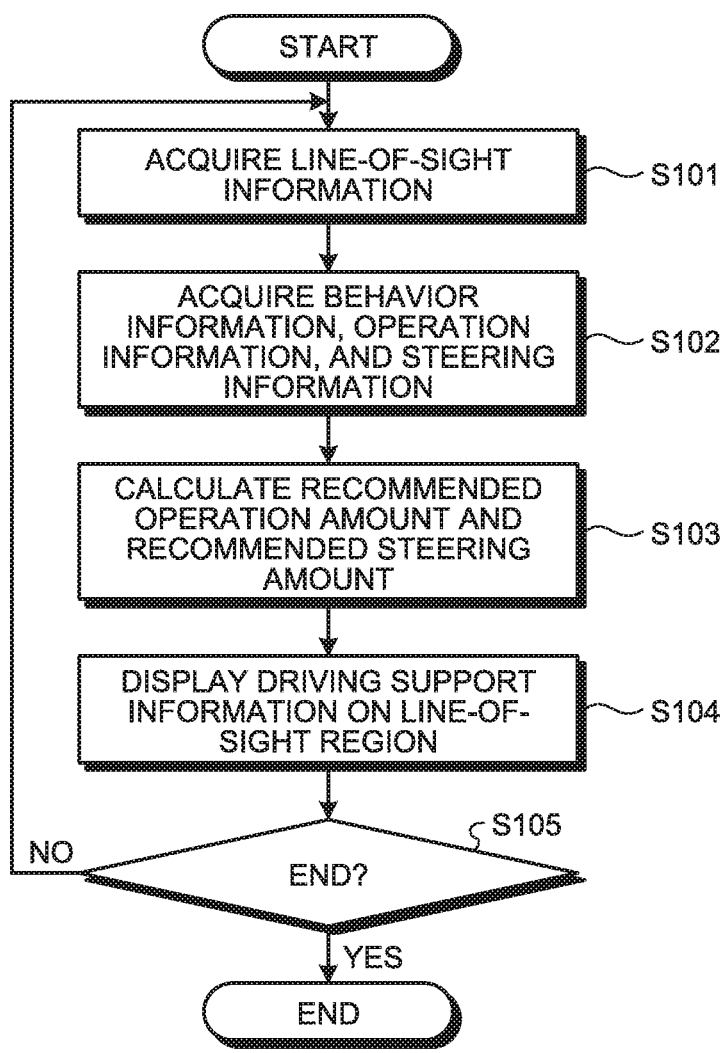
FIG. 2 is a flowchart illustrating an outline of processing executed by the driving support device according to the first embodiment.

Next, processing executed by the driving support device 1 will be described. FIG. 2 is a flowchart illustrating an outline of the processing executed by the driving support device 1.

As illustrated in FIG. 2, first of all, the ECU 19 obtains line-of-sight information about the line of sight of the driver detected by the line-of-sight sensor 16 (step S101), and acquires the behavior information about the vehicle from the behavior sensor 14, the operation information about the driver's operation amount from the operation sensor 12, and the steering information about the driver's steering amount from the steering wheel sensor 13 (step S102).

Next, the ECU 19 inputs, to the learned model stored in the learned model storage unit 18, input parameters that are the vehicle speed of the vehicle, the vehicle behavior information, the driver's operation information, and the driver's steering information, to cause the learned model to calculate an output parameter that is each of the recommended operation amount on the accelerator pedal and the recommended steering amount on the steering wheel (step S103).

Thereafter, the ECU 19 causes the display unit 17 to project and display the driving support information, by outputting the driving support information to the display unit 17 so that the driving support information is displayed in the driver's visual field (step S104).

Figure 3:
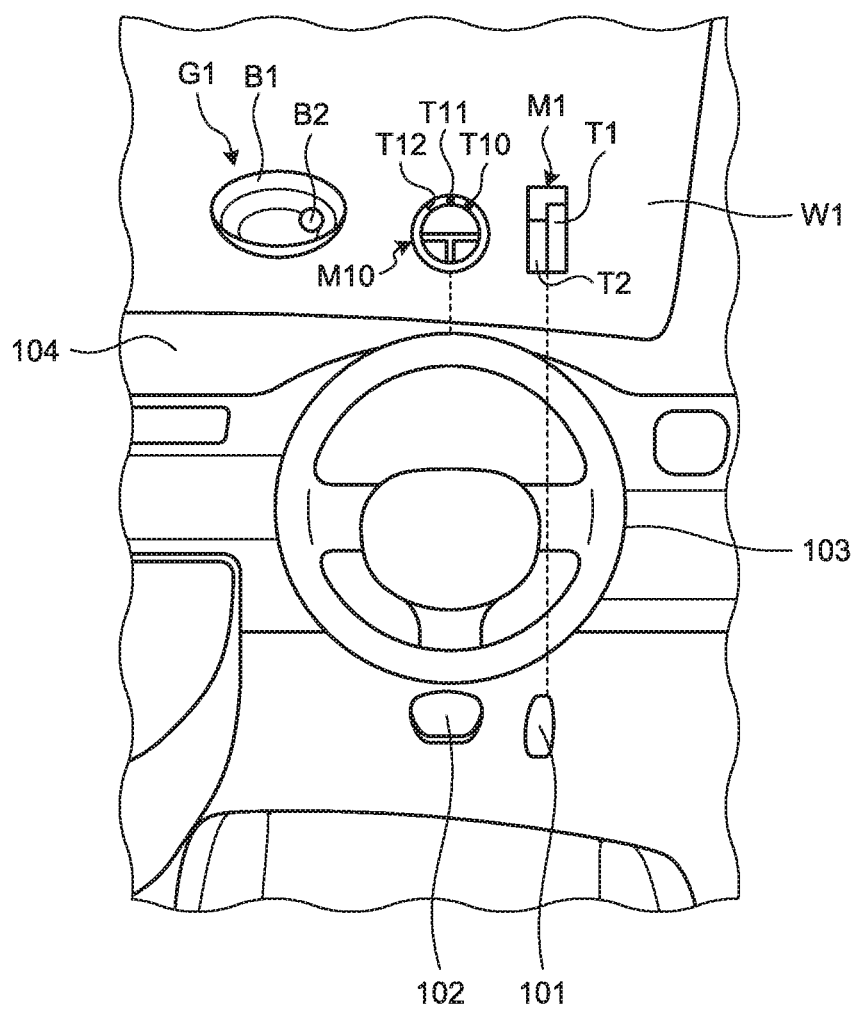
FIG. 3 is a diagram schematically illustrating a display position of driving support information, as a result of an ECU according to the first embodiment causing a display unit to display the driving support information.

Now, the driving support information output by the ECU 19 will be described in detail. FIG. 3 is a diagram schematically illustrating a display position of the driving support information, as a result of the ECU 19 causing the display unit 17 to display the driving support information.

As illustrated in FIG. 3, the ECU 19 outputs driving support information M1 to the display unit 17, so that the driving support information M1 is projected and displayed on a region that is within the driver's visual field on the windshield W1, and is right above an accelerator pedal 101 that is an operation member provided in the vehicle 100. The driving support information M1 includes an operation amount T1 by which the accelerator pedal 101 is actually being operated by the driver and a recommended operation amount T2 on the accelerator pedal 101. In this case, the ECU 19 may output each of the operation amount T1 and the recommended operation amount T2 to the display unit 17, to be in an identifiable display mode. For example, the operation amount T1 and the recommended operation amount T2 may be respectively displayed in red and green. The ECU 19 outputs the driving support information M1 to the display unit 17 so that the driving support information M1 for the accelerator pedal 101 is displayed. Furthermore, for example, driving support information including an operation amount and a recommended operation amount for a brake pedal 102, similar to that for the accelerator pedal 101, may be output to the display unit 17. Furthermore, two pieces of driving support information may be output to the display unit 17, so that the respective pieces of driving support information for the brake pedal 102 and the accelerator pedal 101 are displayed side by side.

Furthermore, the ECU 19 outputs driving support information M10 to the display unit 17, so that the driving support information M10 is projected and displayed in a region that is within the driver's visual field on the windshield W1, and is right above a steering wheel 103 of the vehicle 100. The driving support information M10 includes a reference position T10 of the steering wheel 103, a steering amount T11 of the actual steering operation by the driver from the reference position (center position) of the steering wheel 103, and a recommended steering amount T12 for the steering wheel 103. In this case, the ECU 19 may output each of the reference position T10, the steering amount T11, and the recommended steering amount T13 to the display unit 17, to be in an identifiable display mode. For example, the reference position T10, the steering amount T11, and the recommended steering amount T12 may be respectively displayed in blue, red, and green.

Furthermore, the ECU 19 outputs driving support information G1 to the display unit 17 so that the driving support information G1 is projected and displayed on a region on the driver's line of sight between the driver and the windshield W1 of the vehicle. The driving support information G1 includes a receptacle image B1 that has a recessed surface and a bowl shape, and a ball image B2 that is virtually movable on the receptacle image B1 in accordance with a change in forward, backward, leftward, or rightward gravitational acceleration on the vehicle 100. The ECU 19 outputs the ball image B2 to the display unit 17 so as to move on the receptacle image B1 based on the behavior information input from the behavior sensor 14. The ECU 19 causes the display unit 17 to display the driving support information G1 in a three-dimensional shape. However, the disclosure is not limited to this. For example, a two-dimensional-image arrow or graphic may be displayed to move in a plane on the display unit 17.

As described above, the driver can intuitively recognize the actual operation amount and the recommended operation amount simply by moving the line of sight without changing the visual field for driving at the time of driving. Thus, the driver can feel the driving pleasure and drive with improved driving technique, with safety ensured.

Referring back to FIG. 2, step S105 and after will further be described.

In step S105, the ECU 19 determines whether the IG switch 10 is turned OFF. When it is determined by the ECU 19 that the IG switch 10 is in the OFF state (step S105: Yes), the driving support device 1 ends the processing. On the other hand, when it is determined by the ECU 19 that the IG switch 10 is not in the OFF state (step S105: No), the driving support device 1 returns to step S101.

According to the first embodiment described above, the ECU 19 outputs the driving support information M1, M10, G1, for supporting the driving of the vehicle, to the driver's visual field based on the driver's line-of-sight information. Thus, the driver does not change the visual field while driving, whereby safety during driving can be ensured.

Furthermore, according to the first embodiment, the driver outputs the driving support information M1 to the display unit 17 so that the ECU 19 projects and displays the driving support information M1 right above the accelerator pedal 101. Thus, the driver can intuitively recognize the driving support information M1.

Furthermore, according to the first embodiment, the ECU 19 outputs the actual operation amount T1 and the recommended operation amount T2 to the display unit 17, so that the operation amount T1 and the recommended operation amount T2 are projected and displayed right above the accelerator pedal 101. Thus, the driver can perform operations while recognizing a difference between the actual operation amount and the recommended operation amount. Thus, the driver can feel the driving pressure and drive with improved driving technique.

Furthermore, according to the first embodiment, the ECU 19 outputs the driving support information G1 to the display unit 17, so that the driving support information G1 is projected and displayed on a region on the line of sight of the driver between the driver and the windshield W1 of the vehicle. Thus, the driver can feel the driving pressure while safety during driving can be ensured.

Furthermore, according to the first embodiment, the ECU 19 outputs the driving support information G1 to the display unit 17 so that the driving support information G1 based on the behavior of the vehicle is projected and displayed. Thus, the driver can intuitively recognize the behavior of the vehicle to perform an operation in accordance with the vehicle behavior, and thus can drive with improved driving technique.

Furthermore, according to the first embodiment, the ECU 19 moves the ball image B2 on the receptacle image B1 in accordance with a change in the forward, backward, leftward, or rightward gravitational acceleration on the vehicle. Thus, the driver can intuitively recognize the behavior of the vehicle to perform an operation in accordance with the vehicle behavior, and thus can drive with improved driving technique.

In the first embodiment, the ECU 19 outputs the driving support information to the display unit 17 so that the driver can visually recognize the driving support information. However, the disclosure is not limited to this. For example, the ECU 19 may output driving support information for supporting the driving of the vehicle to the display unit 17 so that the driving support information is displayed in the visual field of an occupant in the vehicle based on the line-of-sight information about the occupant.

First Modification of First Embodiment

Next, a first modification of the first embodiment will be described. In the first embodiment described above, the vehicle 100 is assumed to be an automatic transmission vehicle. On the other hand, in the first modification of the first embodiment, the vehicle 100 is assumed to be a manual transmission vehicle.

Figure 4:
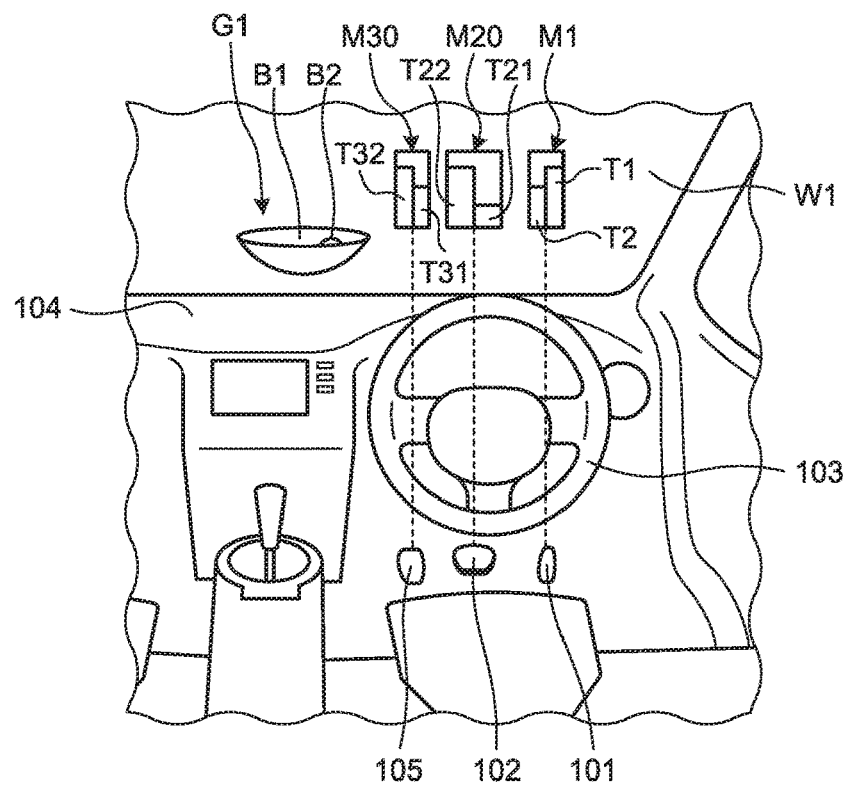
FIG. 4 is a diagram schematically illustrating a display position of driving support information, as a result of the ECU according to a first modification of the first embodiment causing the display unit to display the driving support information.

FIG. 4 is a diagram schematically illustrating a display position of the driving support information, as a result of the ECU 19 according to the first modification of the first embodiment causing the display unit 17 to display the driving support information.

As illustrated in FIG. 4, in addition to the driving support information M1 and the driving support information G1 described above, the ECU 19 outputs driving support information M20 for supporting a driving operation on the brake pedal 102 and driving support information M30 for supporting a driving operation on a clutch pedal 105 to the display unit 17, to cause the display unit 17 to display the driving support information M20 and the driving support information M30. In this case, the ECU 19 outputs the driving support information M20 and the driving support information M30 to the display unit 17 so that the driving support information M20 and the driving support information M30 are respectively displayed on regions right above the brake pedal 102 and the clutch pedal 105.

The driving support information M20 includes an operation amount T21 by which the brake pedal 102 is actually operated by the driver, and a recommended operation amount T22 on the brake pedal 102 calculated by the ECU 19 based on the operation amount T21 by the driver on the brake pedal 102 and the learned model. In this case, the ECU 19 may output each of the operation amount T21 and the recommended operation amount T22 to the display unit 17, to be in an identifiable display mode. For example, the operation amount T21 and the recommended operation amount T22 may be respectively displayed in red and green.

The driving support information M30 includes an operation amount T31 by which the clutch pedal 105 is actually operated by the driver and a recommended operation amount T32 on the clutch pedal 105 calculated by the ECU 19 based on the operation amount T31 on the clutch pedal 105 by the driver. In this case, the ECU 19 may output each of the operation amount T31 and the recommended operation amount T32 to the display unit 17, to be in an identifiable display mode. For example, the operation amount T31 and the recommended operation amount T32 may be respectively displayed in red and green.

According to the first modification of the first embodiment described above, the ECU 19 outputs the driving support information M1, M20, M30, G1 for supporting the driving of the vehicle to the visual field including the driver's line of sight based on the driver's line-of-sight information. Thus, the driver does not change the visual field during driving, whereby safety during driving can be ensured.

Second Modification of First Embodiment

Figure 5:
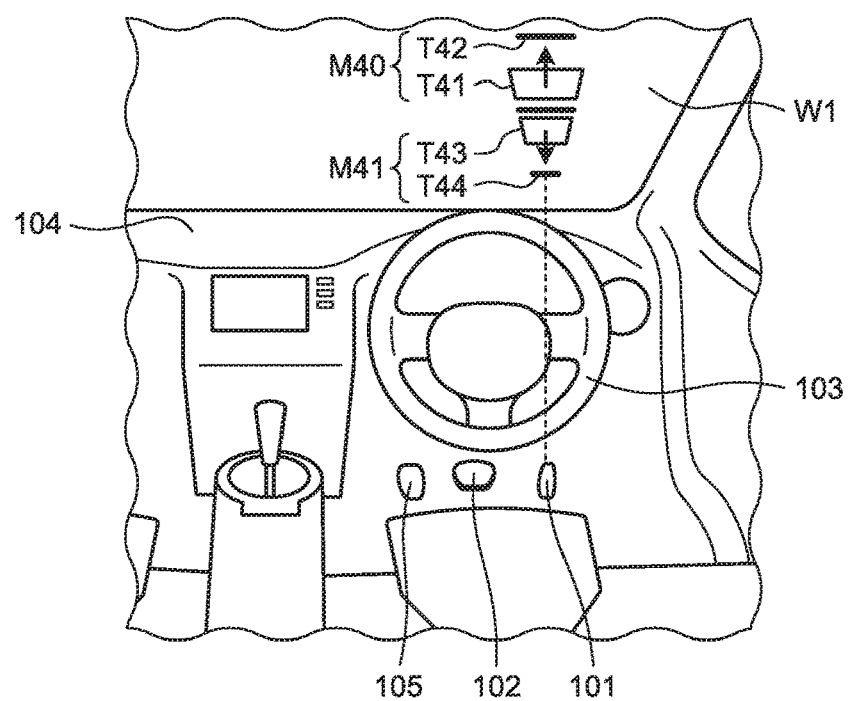
FIG. 5 is a diagram schematically illustrating a display position of driving support information, as a result of the ECU according to a second modification of the first embodiment causing the display unit to display the driving support information.

Next, a second modification of the first embodiment will be described. FIG. 5 is a diagram schematically illustrating a display position of the driving support information, as a result of the ECU 19 according to the second modification of the first embodiment causing the display unit 17 to display the driving support information.

As illustrated in FIG. 5, the ECU 19 outputs driving support information M40 and driving support information M41 to the display unit 17, so that the driving support information M40 and the driving support information M41 are projected and displayed in a region of the windshield W1 corresponding to the visual field of the driver, and is right above the accelerator pedal 101. The driving support information M40 includes an operation amount T41 by which the accelerator pedal 101 is actually operated by the driver and a recommended operation amount T42 on the accelerator pedal 101. The driving support information M41 includes an operation amount T43 by which the brake pedal 102 is actually operated by the driver and a recommended operation amount T44 on the brake pedal 102. Furthermore, the ECU 19 may output each of the operation amounts T41 and T43 and the recommended operation amounts T42 and T44 to the display unit 17 to be in an identifiable display mode.

According to the second modification of the first embodiment described above, the ECU 19 outputs the driving support information M40 and M41 for supporting the driving of the vehicle to the visual field including the driver's line of sight based on the driver's line-of-sight information. Thus, the driver does not change the visual field during driving, whereby safety during driving can be ensured.

Third Modification of First Embodiment

Figure 6:
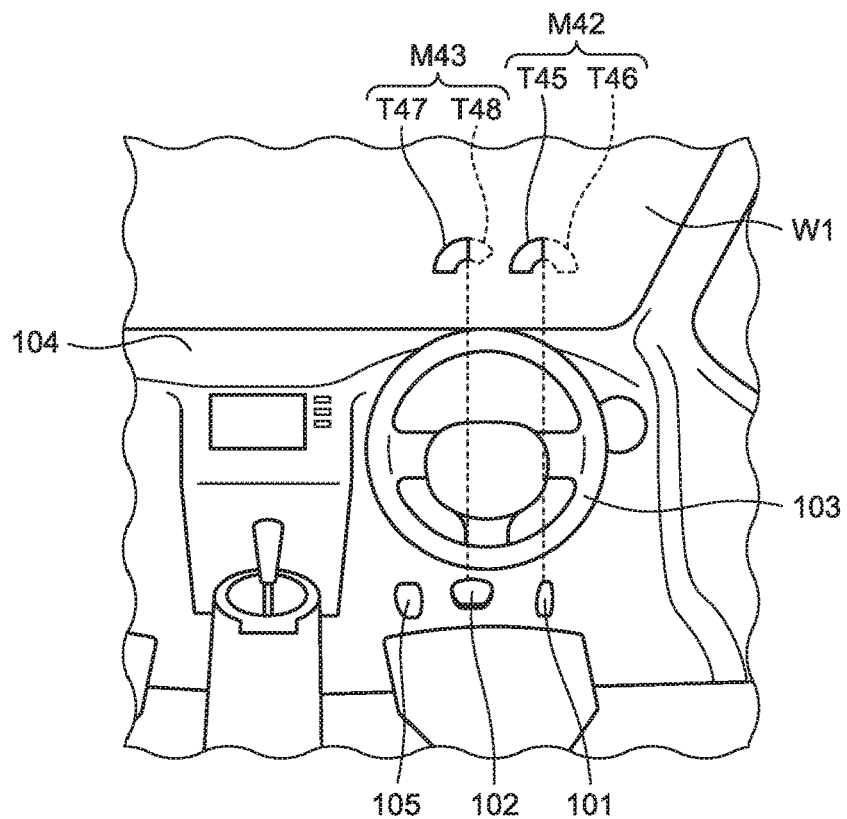
FIG. 6 is a diagram schematically illustrating a display position of driving support information, as a result of the ECU according to a third modification of the first embodiment causing the display unit to display the driving support information.

Next, a third modification of the first embodiment will be described. FIG. 6 is a diagram schematically illustrating a display position of the driving support information, as a result of the ECU 19 according to the third modification of the first embodiment causing the display unit 17 to display the driving support information.

As illustrated in FIG. 6, the ECU 19 outputs driving support information M42 and driving support information M43 to the display unit 17, so that the driving support information M42 and the driving support information M43 are projected and displayed in regions of the windshield W1 corresponding to the visual field of the driver, and right above the accelerator pedal 101 and the brake pedal 102, respectively. The driving support information M42 includes an operation amount T45 by which the accelerator pedal 101 is actually operated by the driver and a recommended operation amount T46 on the accelerator pedal 101. The driving support information M43 includes an operation amount T47 by which the brake pedal 102 is actually operated by the driver and a recommended operation amount T48 on the brake pedal 102. Furthermore, the ECU 19 may output each of the operation amounts T45 and T47 and the recommended operation amounts T46 and T48 to the display unit 17 to be in an identifiable display mode.

According to the third modification of the first embodiment described above, the ECU 19 outputs the driving support information M42, M43 for supporting the driving of the vehicle to the visual field including the driver's line of sight based on the driver's line-of-sight information. Thus, the driver does not change the visual field during driving, whereby safety during driving can be ensured.

Second Embodiment

Next, a second embodiment will be described. In the first embodiment described above, the driving support information is displayed and projected in the vehicle by the display unit 17. In the second embodiment, the driving support information is displayed using a wearable device. In the following, components that are the same as those in the driving support device 1 according to the first embodiment described above are denoted by the same reference numerals, and detailed descriptions thereof will be omitted.

Configuration of Driving Support System

Figure 7:
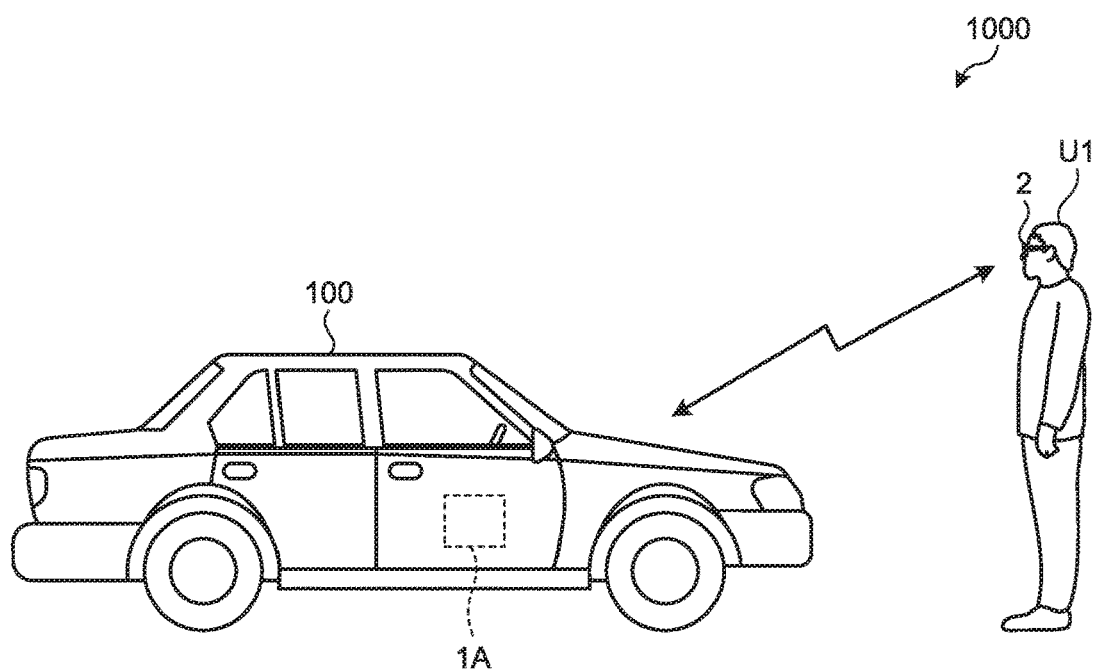
FIG. 7 is a diagram illustrating a schematic configuration of a driving support system according to a second embodiment.
Figure 8:
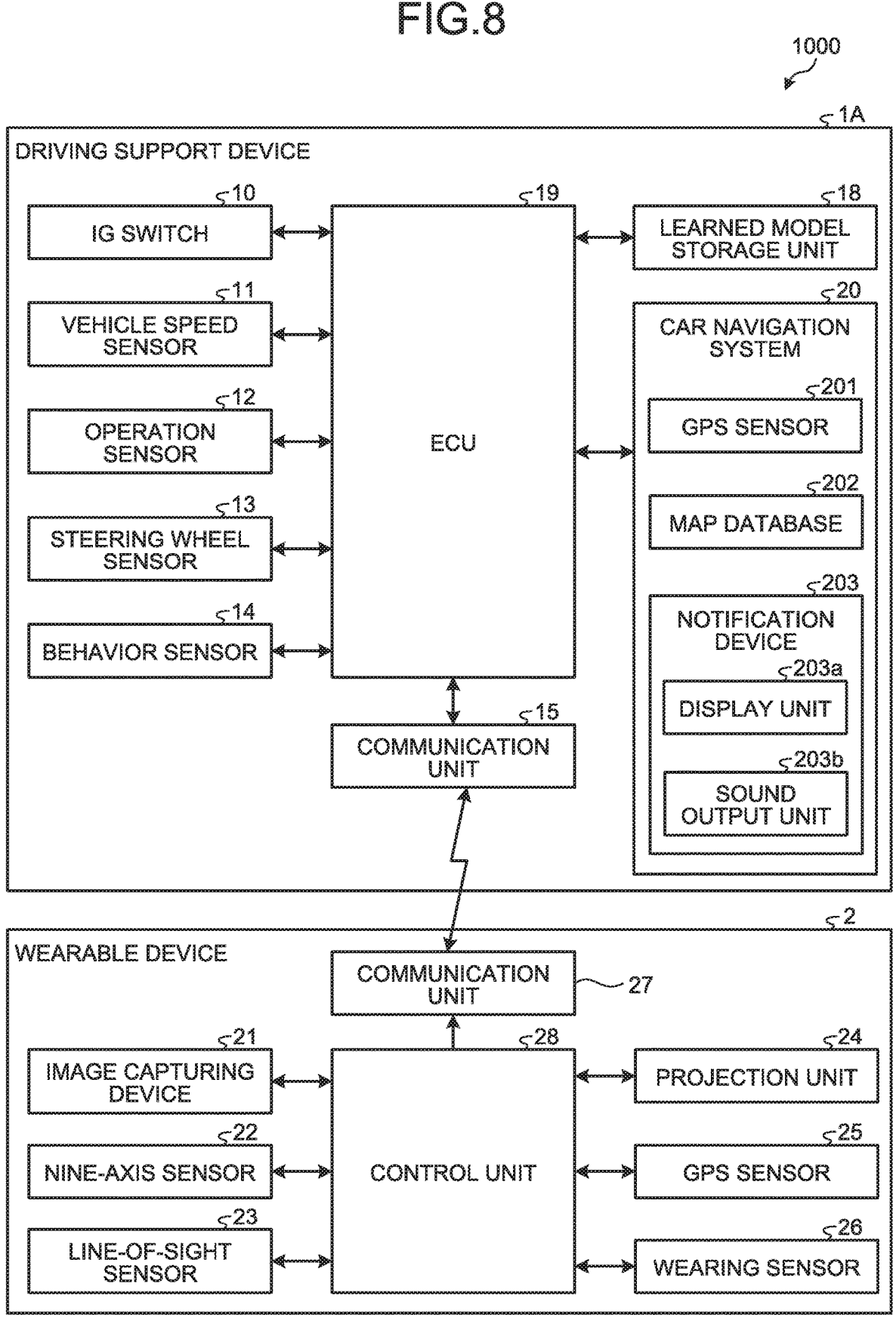
FIG. 8 is a block diagram illustrating a functional configuration of the driving support system according to the second embodiment.
Figure 9:
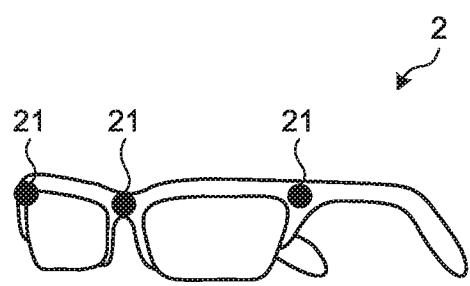
FIG. 9 is a diagram illustrating a schematic configuration of a wearable device according to the second embodiment.

FIG. 7 is a diagram illustrating a schematic configuration of a driving support system according to the second embodiment. FIG. 8 is a block diagram illustrating a functional configuration of the driving support system according to the second embodiment. FIG. 9 is a diagram illustrating a schematic configuration of a wearable device according to the second embodiment.

A driving support system 1000 illustrated in FIGS. 7 to 9 includes a driving support device 1A provided in the vehicle 100 and a wearable device 2 that can be worn by a driver U1 and can perform bidirectional communications with the driving support device 1A according to a predetermined communication standard.

Configuration of Driving Support Device

First of all, the configuration of the driving support device 1A will be described. The driving support device 1A illustrated in FIGS. 7 to 9 has the configuration that is the same as that of the driving support device 1 according to the first embodiment described above except that the line-of-sight sensor 16 and the display unit 17 are omitted from the configuration of the driving support device 1 and that a car navigation system 20 is additionally provided. The driving support device 1A may be incorporated in the wearable device 2.

The car navigation system 20 includes a Global Positioning System (GPS) sensor 201, a map database 202, and a notification device 203.

The GPS sensor 201 receives signals from a plurality of GPS satellites and transmitting antennas, and calculates the position of the vehicle 100 based on the received signals. The GPS sensor 201 is formed by using a GPS reception sensor or the like. A plurality of the GPS sensors 201 may be installed to improve the accuracy regarding the direction of the vehicle 100.

The map database 202 stores various types of map data. The map database 202 may be formed by using a recording medium such as a hard disk drive (HDD) or a solid state drive (SSD).

The notification device 203 may include a display unit 203a that displays an image, a video, and text information, and a sound output unit 203b that generates a sound such as a voice or an alarm sound or a bone conduction member and the like. The display unit 203a is formed by using a display such as a liquid crystal or organic EL display. The sound output unit 203b is formed by using a speaker and the like.

The car navigation system 20 with such a configuration notifies the driver of information using the display unit 203a and the sound output unit 203b. This information is provided by overlaying the current position of the vehicle 100, acquired by the GPS sensor 201, on map data stored in the map database 202, and thus includes a road on which the vehicle 100 is currently travelling, a route to the destination, and the like.

Configuration of Wearable Device

Next, the configuration of the wearable device 2 will be described. The wearable device 2 illustrated in FIGS. 7 to 9 is an eyewear-type device that can be worn by the driver and can provide augmented reality (AR). Furthermore, the wearable device 2 is a device that forms an image on the driver's retina, so that a virtual image can be viewed in the driver's visual field while transmitting light from the driver's visual field. The wearable device 2 includes an image capturing device 21, a nine-axis sensor 22, a projection unit 24, a GPS sensor 25, a wearing sensor 26, a communication unit 27, a control unit 28, and the like.

A plurality of the image capturing devices 21 may be provided as illustrated in FIG. 9. Under the control of the control unit 28, the image capturing device 21 generates image data by, for example, capturing an image on the user's line of sight, and outputs the image data to the control unit 28. The image capturing device 21 is formed by using an optical system including one or a plurality of lenses, as well as a CCD, a CMOS, or the like that generates image data by receiving an object image corresponding to the light focused by the optical system.

The nine-axis sensor 22 is formed by using a three-axis gyro sensor, a three-axis acceleration sensor, and a three-axis geomagnetic sensor (compass). The nine-axis sensor 22 detects an angular velocity and an acceleration on the wearable device 2, and outputs a result of the detection to the control unit 28. Furthermore, the nine-axis sensor 22 detects an absolute direction by detecting geomagnetism, and outputs a result of the detection to the control unit 28.

A line-of-sight sensor 23 detects the direction of the line of sight of the driver who is wearing the wearable device 2, and outputs a result of the detection to the control unit 28. The line-of-sight sensor 23 is formed by using an optical system, a CCD or CMOS, a memory, and a processor having hardware such as a CPU or a GPU. The line-of-sight sensor 23 detects a non-moving part (for example, eye inner corner) of the driver's eyes as a reference point using, for example, a known template matching, and detects a moving part of the eye (for example, iris) as a moving point. The direction of line of sight of the driver is detected based on the positional relationship between the reference point and the moving part.

Under the control of the control unit 28, the projection unit 24 projects the image, video and text information toward the wearable device display unit (for example, a lens unit) and the retina of the driver. The projection unit 24 is formed by using an RGB laser beam that emits each of RGB laser beams, a MEMS mirror that reflects the laser beams, and a reflection mirror for projecting the laser beams reflected from the MEMS mirror onto the retina of the driver.

The GPS sensor 25 receives signals from a plurality of GPS satellites, and calculates the position of the wearable device 2 based on the received signals. The GPS sensor 25 outputs the calculated position of the wearable device 2 to the control unit 28. The GPS sensor 25 is formed by using a GPS reception sensor or the like.

The wearing sensor 26 detects a wearing state of the user, and outputs a result of the detection to the control unit 28. For example, the wearing sensor 26 is formed by using a pressure sensor that detects the pressure when the user wears the wearable device 2, and a vital sensor that detects vital information such as the user's body temperature, pulse, brain waves, blood pressure, and sweating state.

Under the control of the control unit 28, the communication unit 27 transmits and receives various pieces of information to and from the driving support device 1 or a server, according to a predetermined communication standard. The communication unit 27 is formed by using a communication module supporting wireless communications.

The control unit 28 controls operations of components of the wearable device 2. The control unit 28 is formed by using a memory and a processor having hardware such as a CPU.

Processing Executed by Driving Support Device

Figure 10:
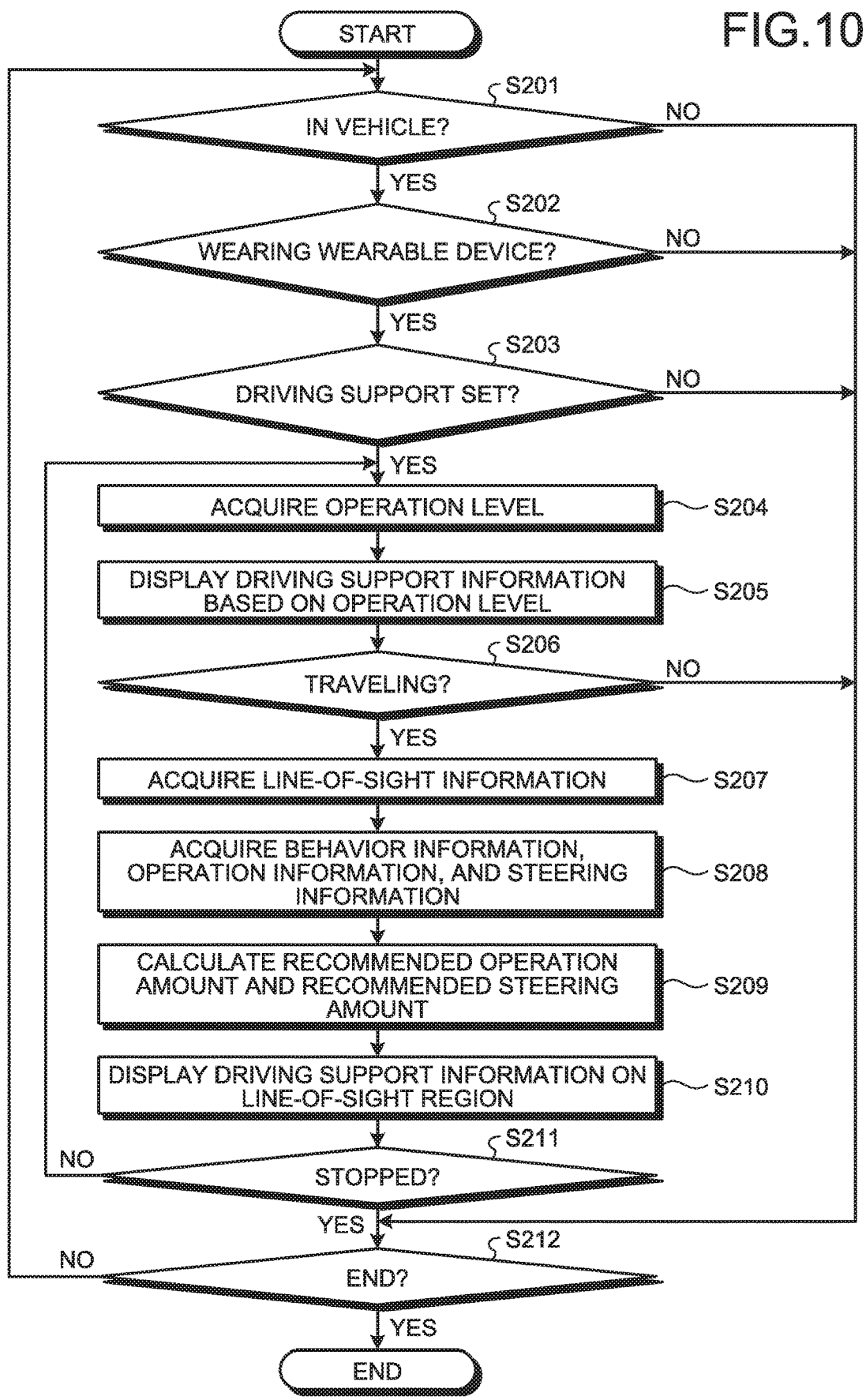
FIG. 10 is a flowchart illustrating an outline of processing executed by the driving support device according to the second embodiment.

Next, processing executed by the driving support device 1A will be described. FIG. 10 is a flowchart illustrating an outline of the processing executed by the driving support device 1A.

As illustrated in FIG. 10, the ECU 19 determines whether the driver is in the vehicle 100 (step S201). For example, the ECU 19 calculates a distance between the vehicle 100 and the wearable device 2 based on position information detected by the GPS sensor 25 of the wearable device 2 and received through the communication unit 15 and position information detected by the GPS sensor 201 of the car navigation system 20. Then, the ECU 19 determines whether the distance thus calculated is equal to or more than a predetermined value. When the distance is equal to or more than the predetermined value, the driver is determined to have gotten off the vehicle 100. On the other hand, when the distance is not equal to or more than the predetermined vale, the driver is determined to be in the vehicle 100. In addition to the distance, the ECU 19 may use a result of detection performed by a seat sensor and the like provided to the vehicle 100, to determine whether the driver is in the vehicle 100. When the ECU 19 determines that the driver is in the vehicle 100 (step S201: Yes), the driving support device 1A proceeds to step S202 described later. On the other hand, when the ECU 19 determines that the driver is not in the vehicle 100 (step S201: No), the driving support device 1A proceeds to step S212 described later.

In step S202, the ECU 19 determines whether the driver is wearing the wearable device 2. Specifically, the ECU 19 receives a wearing signal indicating the detection result from the wearing sensor 26 of the wearable device 2 through the communication unit 15, and determines whether the driver is wearing the wearable device 2 based on the received wearing signal. When the ECU 19 determines that the driver is wearing the wearable device 2 (step S202: Yes), the driving support device 1A proceeds to step S203 described later. On the other hand, when the ECU 19 determines that the driver is not wearing the wearable device 2 (step S202: No), the driving support device 1A proceeds to step S212 described later.

In step S203, the ECU 19 determines whether driving support for the vehicle 100 is set by the driver. Specifically, the ECU 19 determines whether the state of an operation unit or a switch (not illustrated) for setting a driving support setting for causing the wearable device 2 to display the driving support information is in the ON state. When the ECU 19 determines that the driving support is set to the vehicle 100 by the driver (step S203: Yes), the driving support device 1A proceeds to step S204 described later. On the other hand, when the ECU 19 determines that the driving support for the vehicle 100 is not set by the driver (step S203: No), the driving support device 1A proceeds to step S212 described later.

In step S204, the ECU 19 acquires an operation level of the driver. Specifically, the ECU 19 acquires the operation level, which indicates operation ability of the driver according to identification information associated with the wearable device 2, from a server (not illustrated) through the communication unit 15. Here, the operation level is, for example, a level determined according to the traveling time of the vehicle 100 by the driver and a level determined according to the driving history of driving based on the above-described driving support information G1.

Then, the ECU 19 outputs the driving support information, for the visual field of the driver, to the wearable device 2 based on the operation level of the driver, to cause the wearable device 2 to display the driving support information (step S205). After step S205, the driving support device 1A proceeds to step S206 described later.

Figure 11:
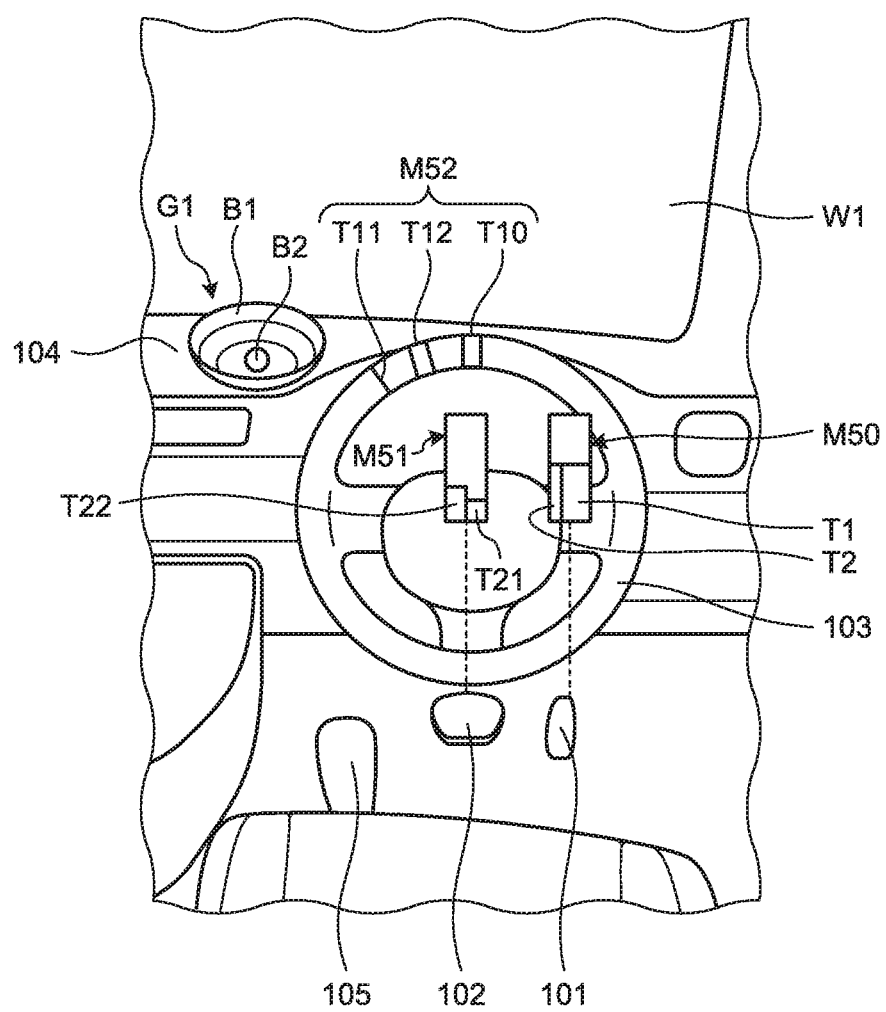
FIG. 11 is a diagram schematically illustrating a display position of driving support information, as a result of the ECU causing a wearable device to display the driving support information while the vehicle is stopped.

Now, the driving support information output by the ECU 19 will be described in detail. FIG. 11 is a diagram schematically illustrating a display position of the driving support information, as a result of the ECU 19 causing the wearable device 2, to which the information is output, to display the driving support information.

As illustrated in FIG. 11, the ECU 19 outputs driving support information M50 and driving support information M51 to the wearable device 2, so that the driving support information M50 and the driving support information M51 are displayed in regions over the steering wheel 103 in the visual field of the driver, and right above the accelerator pedal 101 and the brake pedal 102, respectively. The driving support information M50 includes an operation amount T1 by which the accelerator pedal 101 is actually operated by the driver and a recommended operation amount T2 on the accelerator pedal 101. The driving support information M51 includes an operation amount T21 by which the brake pedal 102 is actually operation by the driver and a recommended operation amount T22 on the brake pedal 102. In this case, the ECU 19 may output each of the operation amounts T1 and T3, the operation amount T21, and the recommended operation amount T22 to the wearable device 2, to be in an identifiable display mode.

Furthermore, the ECU 19 outputs driving support information M52 to the wearable device 2 so that the driving support information M52 is displayed in a region overlapping with a part of the steering wheel 103 in the driver's visual field. The driving support information M52 includes a steering amount T11 by which the steering wheel 103 is actually operated by the driver from the reference position T10 (center position) of the steering wheel 103, and a recommended steering amount T12 for the steering wheel 103.

Furthermore, the ECU 19 outputs the driving support information G1 to the wearable device 2 so that the driving support information G1 is displayed in the central region over the instrument panel in the driver's line-of-sight region. In addition, the driving support information G1 can be displayed in a region other than the center region over the instrument panel in the driver's line-of-sight region. A position at which the driving support information G1 is displayed can be changed according to the driver's operation as long as the driving support information G1 is displayed over the instrument panel.

Furthermore, under the situation illustrated in FIG. 11, the ECU 19 may limit the display content of the driving support information based on the operation level of the driver. Specifically, the ECU 19 determines whether the driver's operation level is equal to or higher than a predetermined level. If the operation level is equal to or higher than the predetermined level, for example, the driving support information G1 is output to the wearable device 2, so that only the driving support information G1 is displayed. Thus, displaying can be performed according to the operation level of the driver, so that the driver can drive with an improved driving technique while feeling the driving pleasure. Under the situation illustrated in FIG. 11, the ECU 19 may limit the display content of the driving support information based on an operation signal from a switch or the like (not illustrated). For example, when the operation signal for prohibiting the displaying of the driving support information is input from a switch or the like (not illustrated), the ECU 19 may stop the output of the driving support information, or may control the display content of the driving support information in accordance with an instruction signal instructing a level from the switch (not illustrated). Thus, displaying can be performed in accordance with the driver's preference.

As described above, using the wearable device 2, the driver can intuitively recognize the actual operation amount and the recommended operation amount simply by moving the line of sight without changing the visual field for driving at the time of driving. Thus, the driver can drive with improved driving technique while feeling the driving pleasure, with safety ensured.

Referring back to FIG. 10, step S206 and after will further be described.

The ECU 19 determines whether the vehicle 100 is traveling based on the detection result from the vehicle speed sensor 11. When the ECU 19 determines that the vehicle 100 is traveling (step S206: Yes), the driving support device 1A proceeds to step S207 described later. On the other hand, when the ECU 19 determines that the vehicle 100 is not traveling (step S206: No), the driving support device 1A proceeds to step S212 described later.

In step S207, the ECU 19 acquires line-of-sight information about the line of sight of the driver from the line-of-sight sensor 23 of the wearable device 2 via the communication unit 15.

Then, the ECU 19 acquires the behavior information about the vehicle 100 from the behavior sensor 14, the operation information about the driver's operation amount from the operation sensor 12, and the steering information about the driver's steering amount from the steering wheel sensor 13 (step S208).

Next, the ECU 19 inputs, to the learned model stored in the learned model storage unit 18, input parameters that are the vehicle speed of the vehicle 100, the behavior information about the vehicle 100, the driver's operation information, and the driver's steering information, to cause the learned model to calculate an output parameter that is each of the recommended operation amount on the accelerator pedal 101 and the recommended steering amount on the steering wheel 103 (step S209).

Figure 12:
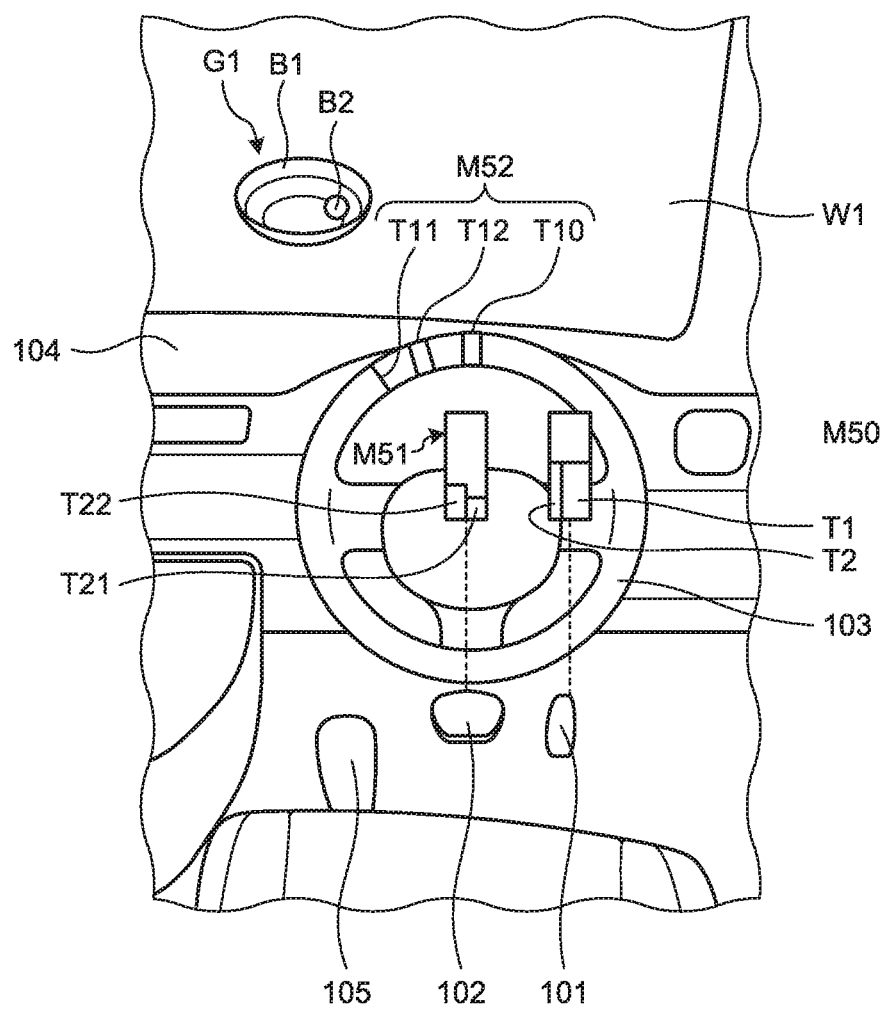
FIG. 12 is a diagram schematically illustrating a display position of driving support information, as a result of the ECU causing a wearable device to display the driving support information while the vehicle is moving.

Then, the ECU 19 outputs the driving support information, for the visual field of the driver, to the wearable device 2, to cause the wearable device 2 to display the driving support information (step S210). Specifically, as illustrated in FIG. 12, the ECU 19 outputs driving support information G1 to the wearable device 2 so that the driving support information G1 is displayed on a region on the driver's line of sight between the driver and the windshield W1 of the vehicle. In this case, the ECU 19 outputs the ball image B2 to the wearable device 2 so that the ball image B2 moves on the receptacle image B1, in accordance with a change in the forward, backward, leftward, or rightward gravitational acceleration on the vehicle 100, based on the behavior information input from the behavior sensor 14. Thus, the driver can intuitively recognize the operation level corresponding to the actual operation amount simply by moving the line of sight without changing the visual field for driving at the time of driving. Thus, the driver can feel the driving pleasure and drive with improved driving technique, with safety ensured.

Thereafter, the ECU 19 determines whether the vehicle 100 has stopped based on the detection result from the vehicle speed sensor 11 (step S211). When the ECU 19 determines that the vehicle 100 has stopped (step S211: Yes), the driving support device 1A proceeds to step S212 described later. On the other hand, when the ECU 19 determines that the vehicle 100 has not stopped (step S211: No), the driving support device 1A proceeds to step S204 described above.

In step S212, the ECU 19 determines whether the IG switch 10 has been turned OFF. When it is determined by the ECU 19 that the IG switch 10 is in the OFF state (step S212: Yes), the driving support device 1A ends the processing. On the other hand, when it is determined by the ECU 19 that the IG switch 10 is not in the OFF state (step S212: No), the driving support device 1A returns to step S201.

According to the second embodiment described above, the ECU 19 outputs the driving support information to the wearable device 2 so that the driving support information is displayed over the steering wheel 103, whereby the driver can intuitively recognize the information, with safety ensured.

Furthermore, according to the second embodiment, the ECU 19 outputs to the wearable device 2, the driving support information M52 that is each of the reference position T10, the steering amount T11, and the recommended steering amount T12 so as to be displayed over the steering wheel 103 in the visual field including the line of sight of the driver. Thus, the driver can perform an operation while recognizing a difference between the actual steering amount and the recommended steering amount, and thus can drive with improved driving technique while feeling driving pleasure.

Furthermore, according to the second embodiment, when the vehicle 100 is in the moving state, the ECU 19 outputs the driving support information G1 to the wearable device 2 so as to be displayed in a region on the driver's line of sight. On the other hand, when the vehicle 100 is not moving, the ECU 19 outputs the driving support information G1 to the wearable device 2 so that the ECU 19 displays the driving support information G1 at the center of an instrument panel 104 of the vehicle 100. Thus, the driver can check and intuitively recognize the behavior of the vehicle 100 on the line of sight while driving the vehicle, and thus can drive with improved driving technique.

Furthermore, according to the second embodiment, the display content of the driving support information is controlled by the ECU 19 based on the operation level serving as an index for the operation ability of the driver. Thus, the driving support information about the operation level suitable for the driver is displayed, whereby driving support suitable for the driver can be provided.

In the second embodiment, the driving support information is output to the wearable device 2 so that the ECU 19 projects and displays the driving support information over the steering wheel 103. Alternatively, the control unit 28 of the wearable device 2 may acquire the line-of-sight information about the line of sight of the driver from the line-of-sight sensor 23 and may perform a control based on the acquired line-of-sight information so that the driving support information, for supporting the driving of the vehicle 100, is projected by the projection unit 24 to be displayed in the visual field including the driver's line of sight. Specifically, the control unit 28 detects the position of the operation member of the vehicle 100 (for example, the steering wheel), based on the image data acquired from the image capturing device 21, and, based on the detection result and the line of sight, controls the projection unit 24 so that the driving support information is projected and displayed over the steering wheel. In this case, the control unit 28 functions as a processor of the wearable device 2.

First Modification of Second Embodiment

Next, a first modification of the second embodiment will be described. In the first modification of the second embodiment, an example of application to a grip handle will be described.

Figure 13:
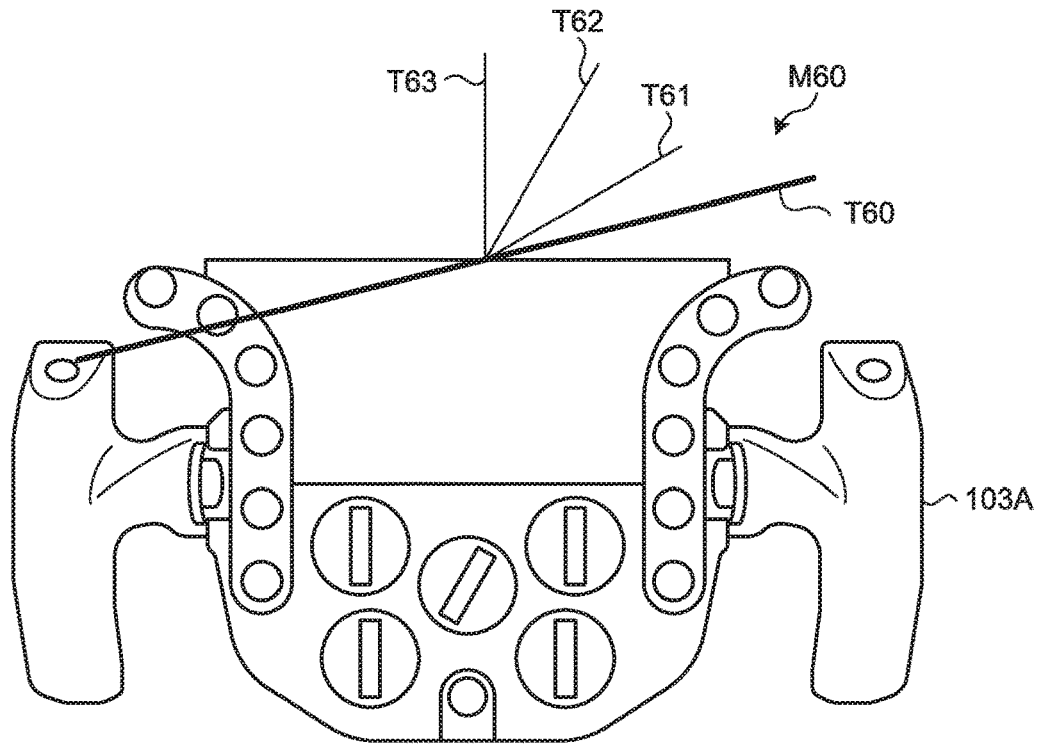
FIG. 13 is a diagram schematically illustrating a display position of driving support information, as a result of an ECU according to a first modification of the second embodiment causing the wearable device to display the driving support information.

FIG. 13 is a diagram schematically illustrating a display position of the driving support information output by the ECU 19 to be displayed by the wearable device 2, according to the first modification of the second embodiment.

As illustrated in FIG. 13, the ECU 19 outputs driving support information M60 to the wearable device 2 so that the driving support information M60 is projected and displayed on a region right above a grip handle 103A, in the visual field of the driver. The driving support information M60 includes a recommended steering amount T60 for the grip handle 103A from a reference position (horizontal position), and angle information T61, T62, and T63 indicating an angle from the reference position.

According to the first modification of the second embodiment described above, the ECU 19 outputs the driving support information M60 to the wearable device 2 so that the driving support information M60 is displayed right above the grip handle 103A. Thus, the driver can intuitively recognize the information, with safety ensured.

Second Modification of Second Embodiment

Next, a second modification of the second embodiment will be described. In the second modification of the second embodiment, an example of application to a control stick will be described.

Figure 14:
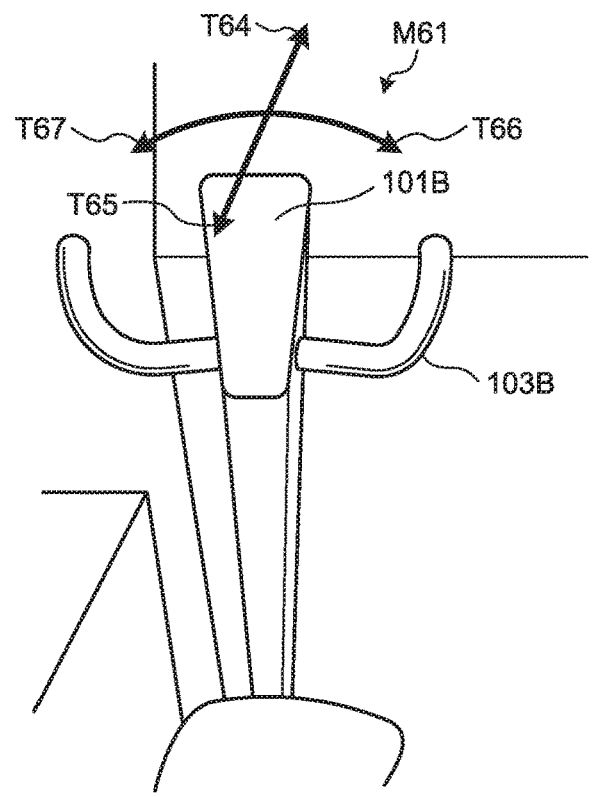
FIG. 14 is a diagram schematically illustrating a display position of driving support information, as a result of an ECU according to a second modification of the second embodiment causing the wearable device to display the driving support information.

FIG. 14 is a diagram schematically illustrating a display position of the driving support information, as a result of the ECU 19 according to the second modification of the second embodiment causing the wearable device 2 to display the driving support information.

As illustrated in FIG. 14, the ECU 19 outputs driving support information M61 to the wearable device 2 so that the driving support information M61 is displayed on a region right above a control stick 103B, in the visual field of the driver. The driving support information M61 includes recommended operation amounts T64 and T65 for the control stick 103B and recommended steering amounts T66 and T67 for the control stick 103B from the reference position. The recommended operation amount T64 indicates a recommended operation amount for the brake, and the recommended operation amount T65 indicates a recommended operation amount for the accelerator.

According to the second modification of the second embodiment described above, the ECU 19 outputs the driving support information M61 to the wearable device 2 so that the driving support information M61 is displayed right above the control stick 103B, whereby the driver can intuitively recognize the information, with safety ensured.

Third Modification of Second Embodiment

Next, a third modification of the second embodiment will be described. In the second embodiment described above, an example using the accelerator pedal 101, the brake pedal 102, and the steering wheel 103 has been described. Alternatively, as in the third modification of the second embodiment, application to a combination of an accelerator bar and a control stick is also feasible.

Figure 15:
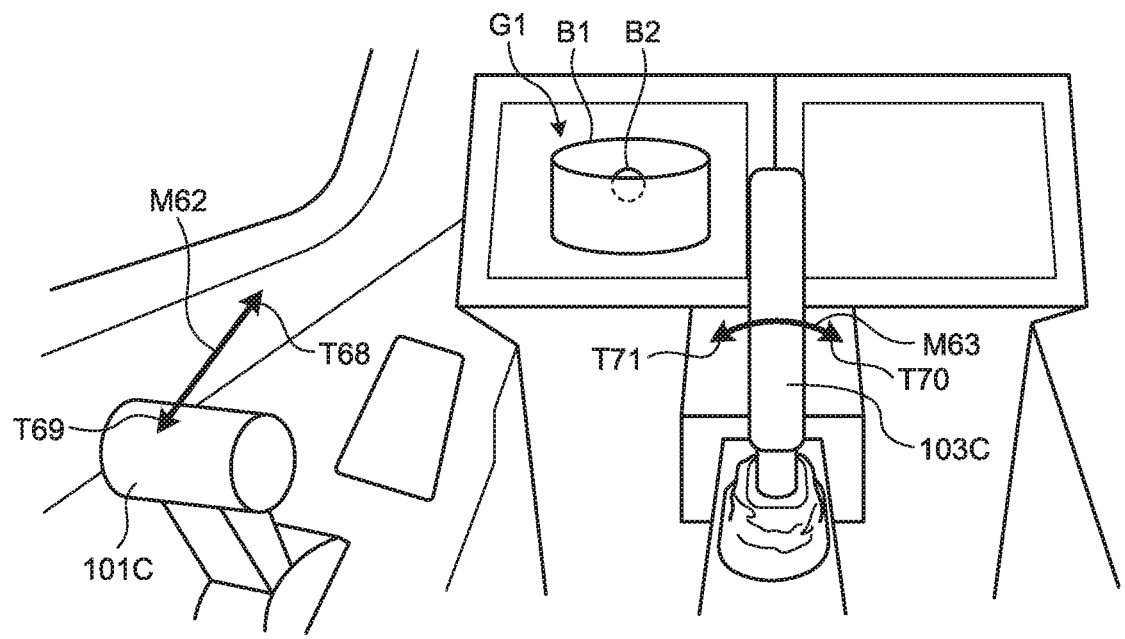
FIG. 15 is a diagram schematically illustrating a display position of driving support information, as a result of an ECU according to a third modification of the second embodiment causing the wearable device to display the driving support information.

FIG. 15 is a diagram schematically illustrating a display position of the driving support information, as a result of the ECU 19 according to the third modification of the second embodiment causing the wearable device 2 to display the driving support information.

As illustrated in FIG. 15, the ECU 19 outputs driving support information M62 to the wearable device 2 so that the driving support information M62 is displayed on a region right above a an accelerator bar 101C, in the visual field of the driver. Furthermore, the ECU 19 outputs driving support information M63 to the wearable device 2 so that the driving support information M63 is displayed on a region right above a control stick 103C, in the visual field of the driver. Furthermore, the ECU 19 outputs the driving support information G1 to the wearable device 2 so that the driving support information G1 is displayed in the driver's visual field. The driving support information M62 includes recommended operation amounts T68 and T69 for the accelerator bar 101C from the reference position. The recommended operation amount T68 indicates a recommended operation amount for the braking, and the recommended operation amount T69 indicates a recommended operation amount for the acceleration. The driving support information M63 includes recommended steering amounts T70 and T71 for the control stick 103C from the reference position (upright information).

According to the third modification of the second embodiment described above, by the ECU 19, the driving support information M62 is projected and displayed on the region right above the accelerator bar 101C and the driving support information M63 is projected and displayed on the region right above the control stick 103C, whereby the driver can intuitively recognize the information, with safety ensured.

Fourth Modification of Second Embodiment

Next, a fourth modification of the second embodiment will be described. The fourth modification of the second embodiment relates to an application to a joystick.

Figure 16:
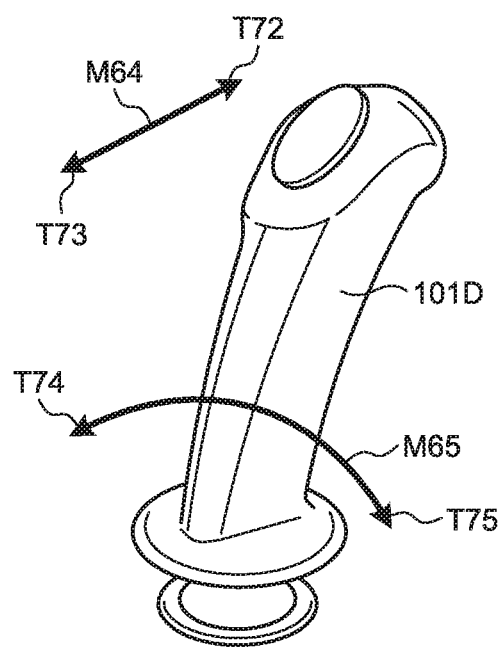
FIG. 16 is a diagram schematically illustrating a display position of driving support information, as a result of an ECU according to a fourth modification of the second embodiment causing the wearable device to display the driving support information.

FIG. 16 is a diagram schematically illustrating a display position of the driving support information, as a result of the ECU 19 according to the fourth modification of the second embodiment causing the wearable device 2 to display the driving support information.

As illustrated in FIG. 16, the ECU 19 outputs driving support information M64 and M65 to the wearable device 2 so that the driving support information M64 and the driving support information M65 are displayed on a region right above a joystick 101D, in the visual field of the driver. The driving support information M64 includes recommended operation amounts T72 and T73 for the joystick 101D from the reference position. The recommended operation amount T72 indicates a recommended operation amount for the acceleration, and the recommended operation amount T73 indicates a recommended operation amount for the braking. The driving support information M65 includes recommended steering amounts T74 and T75 for the joystick 101D from the reference position (upright information).

According to the fourth modification of the second embodiment described above, the ECU 19 outputs the driving support information M64 and the driving support information M65 to the wearable device 2 so that the driving support information M64 and the driving support information M65 are displayed on the region right above the joystick 101D, whereby the driver can intuitively recognize the information, with safety ensured.

Fifth Modification of Second Embodiment

Next, a fifth modification of the second embodiment will be described. The fifth modification of the second embodiment is related to an application to a grip handle type handle.

Figure 17:
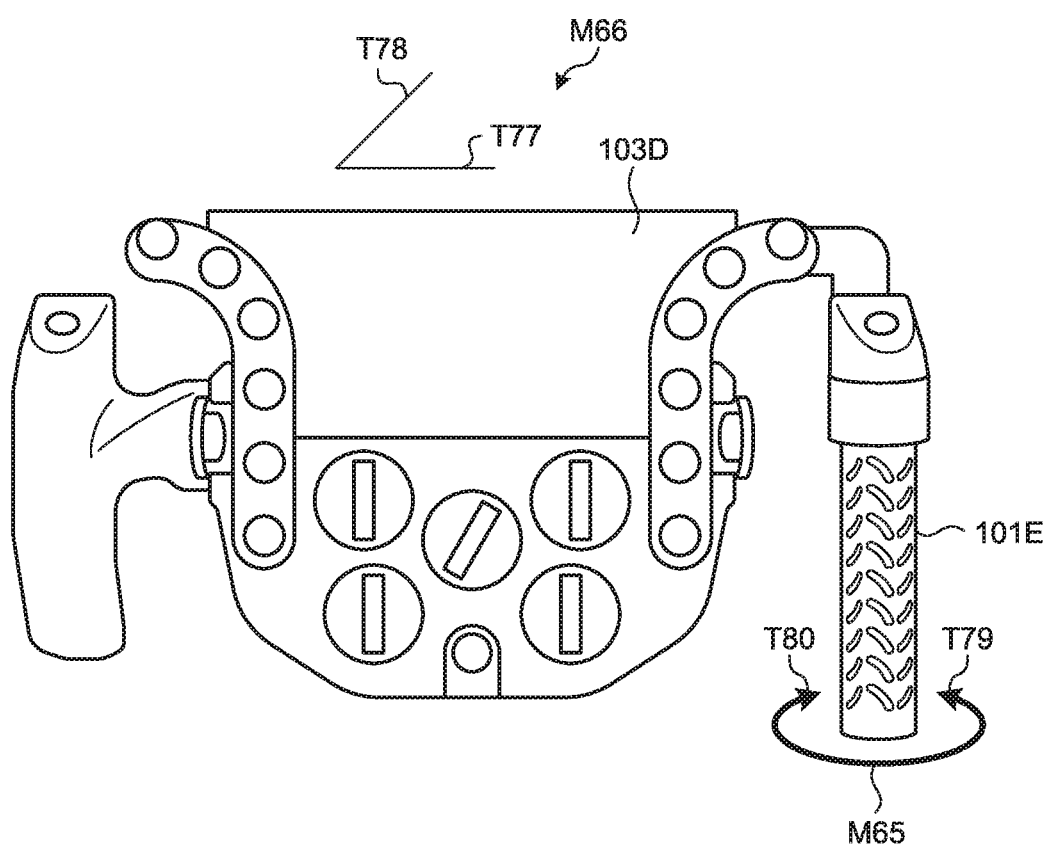
FIG. 17 is a diagram schematically illustrating a display position of driving support information, as a result of an ECU according to a fifth modification of the second embodiment causing the wearable device to display the driving support information.

FIG. 17 is a diagram schematically illustrating a display position of the driving support information, as a result of the ECU 19 according to the fifth modification of the second embodiment causing the wearable device 2 to display the driving support information.

As illustrated in FIG. 17, the ECU 19 outputs driving support information M65 and driving support information M66 to the wearable device 2 so that the driving support information M65 and the driving support information M66 are displayed on a region right above a grip type handle 101E, in the visual field of the driver. The driving support information M65 includes recommended operation amounts T79 and T80 for the grip type handle 101E from the reference position. The recommended operation amount T79 indicates a recommended operation amount for the acceleration, and the recommended operation amount T80 indicates a recommended operation amount for the braking. The driving support information M66 includes a reference position T77 (horizontal position) of a grip handle 103E and a recommended operation amounts T78 from the reference position.

According to the fifth modification of the second embodiment described above, the ECU 19 outputs the driving support information M65 and the driving support information M65 to the wearable device 2 so that the driving support information M65 and the driving support information M66 are displayed on the region right above the grip type handle 101E, whereby the driver can intuitively recognize the information, with safety ensured.

Third Embodiment

Next, a third embodiment will be described. In the first and the second embodiments described above, the ECU 19 of the driving support device 1, 1A outputs the driving support information to be displayed in the driver's visual field based on the driver's line-of-sight information. In the third embodiment, a server acquires the vehicle information, the operation information, the behavior information, and the line-of-sight information from each of the driving support device and the wearable device, to control the driving support information projected by the wearable device. Components that are the same as those in the driving support system 1000 according to the second embodiment described above are denoted by the same reference numerals, and detailed descriptions thereof will be omitted.

Figure 18:
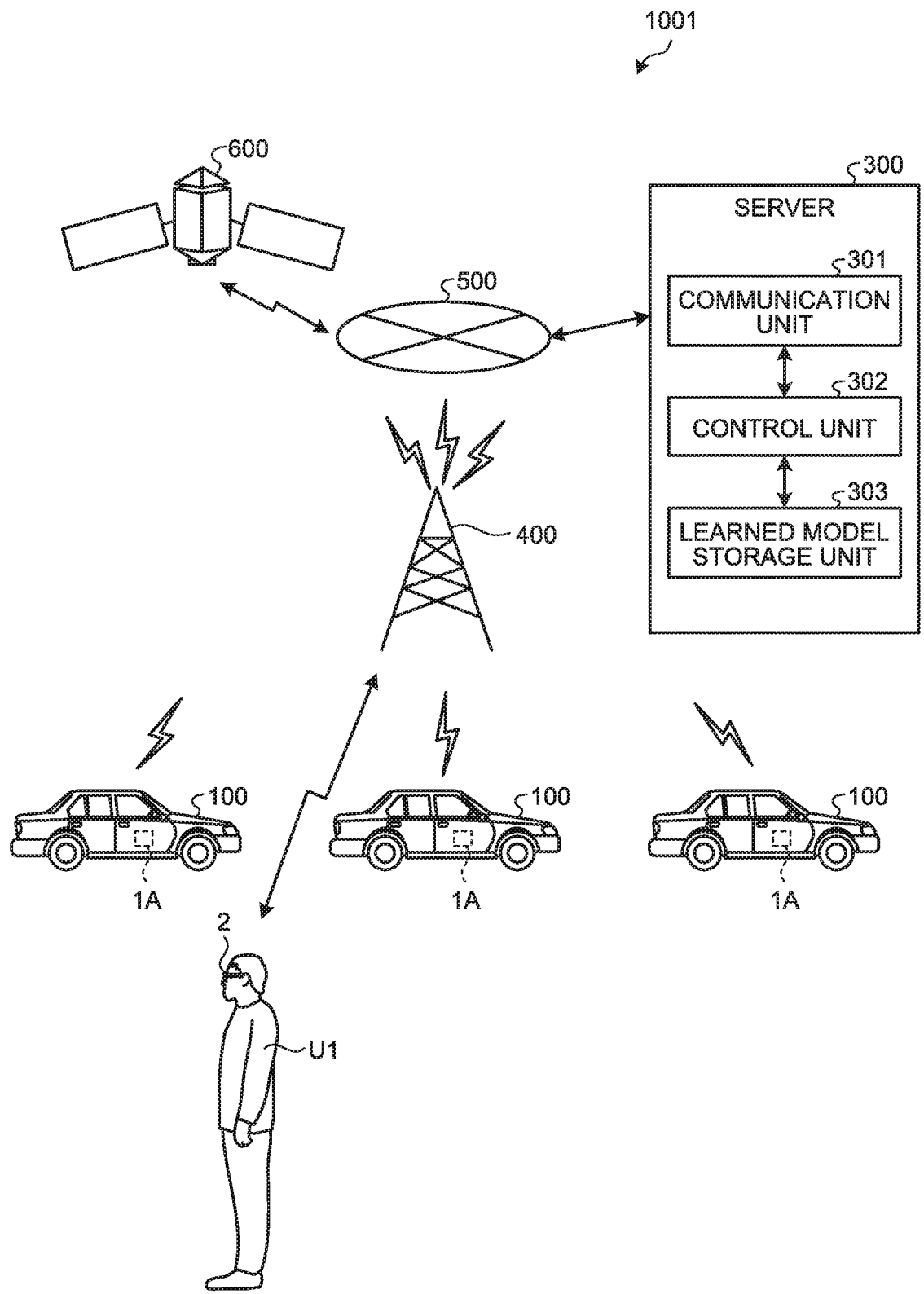
FIG. 18 is a schematic view illustrating a schematic configuration of a driving support system according to a third embodiment.

FIG. 18 is a schematic view illustrating a schematic configuration of a driving support system according to a third embodiment. A driving support system 1001 illustrated in FIG. 18 includes the driving support device 1A installed in each of a plurality of the vehicles 100, the wearable device 2 worn by the driver U1, and a server 300. The plurality of driving support devices 1, the wearable device 2, and the server 300 are configured to be able to communicate information with each other via a base station 400 and a network 500. The server 300 captures an image of an upper view of the vehicle 100 from a GPS satellite 600 via the base station 400 and the network 500 to acquire image data.

Configuration of Server

Next, a configuration of the server 300 will be described. The server 300 includes a communication unit 301 and a control unit 302.

The communication unit 301 transmits and receives various types of information in accordance with a predetermined communication standard via the network 500 and the base station 400, under the control of the control unit 302. Further, the communication unit 301 transmits various types of information to the driving support device 1 of each of the vehicles 100 and the wearable device 2 according to a predetermined communication standard, and the communication unit 301 receives various types of information from the GPS satellite 600, the driving support device 1 of each of the vehicles 100 and the wearable device 2, under the control of the control unit 302. The communication unit 301 is formed by using a communication module supporting wireless communications.

The control unit 302 is formed by using a memory and a processor including hardware that is any of a CPU, a GPU, an FPGA, a DSP, an ASIC, and the like. Based on the line-of-sight information about the line of sight of the driver acquired from the line-of-sight sensor 23 of the wearable device 2 through the communication unit 301, the control unit 302 outputs driving support information to the wearable device 2 so that the driving support information is displayed on the visual field including the line of sight of the driver. Specifically, the control unit 302 inputs the input parameters that are the driver's operation amount on the accelerator pedal acquired from the operation sensor 12 through the communication unit 301 and the vehicle speed of the vehicle acquired from the vehicle speed sensor 11 to the learned model stored in a learned model storage unit 303, and acquires a recommended operation amount on the accelerator pedal which is an output parameter output from the learned model stored in the learned model storage unit 303. Then, the control unit 302 outputs the operation amount and the recommended operation amount to the wearable device 2 so that the operation amount and the recommended operation amount are displayed as driving support information on the region right above the accelerator pedal.

Furthermore, the control unit 302 inputs the input parameters that are the driver's steering amount on the steering wheel acquired from the steering wheel sensor 13 acquired through the communication unit 301 and the vehicle speed of the vehicle acquired from the vehicle speed sensor 11 to the learned model stored in the learned model storage unit 303, and acquires a recommended steering amount on the steering wheel that is an output parameter output from the learned model stored in the learned model storage unit 303. Then, the control unit 302 outputs the steering amount and the recommended steering amount to the wearable device 2 through the communication unit 301 so that the steering amount and the recommended steering amount are displayed as driving support information on the region right above the steering wheel.

Furthermore, the control unit 302 generates the driving support information based on the behavior information about the vehicle acquired from the behavior sensor 4 through the communication unit 301, and outputs the driving support information to the wearable device 2, so that the driving support information is displayed on the region between the driver and the windshield of the vehicle. In the third embodiment, the control unit 302 functions as a processor.

The learned model storage unit 303 stores a learned model used for machine learning that is similar to that in the learned model storage unit 18 according to the first embodiment described above.

According to the third embodiment described above, the control unit 302 outputs the driving support information to the wearable device 2 through the communication unit 301 so that the driving support information is displayed over the steering wheel 103 in the visual field including the line of sight of the driver, whereby the driver can intuitively recognize the information, with safety ensured.

Other Embodiments

Figure 19:
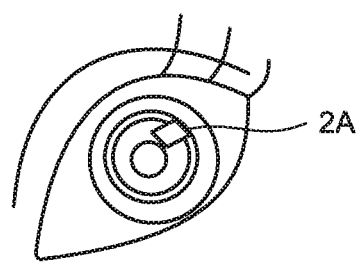
FIG. 19 is a diagram illustrating a schematic configuration of a wearable device according to a modification of the second and the third embodiments.
Figure 20:
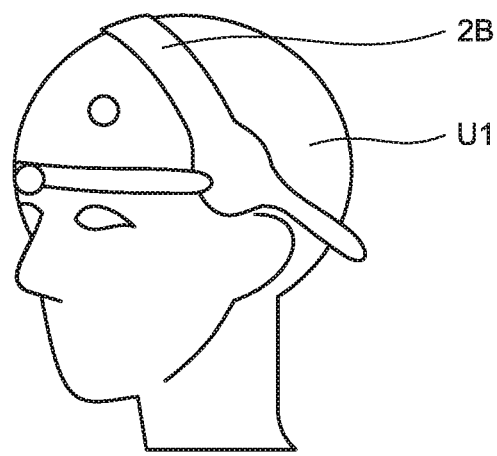
FIG. 20 is a diagram illustrating a schematic configuration of a wearable device according to a modification of the second and the third embodiments.
Figure 21:
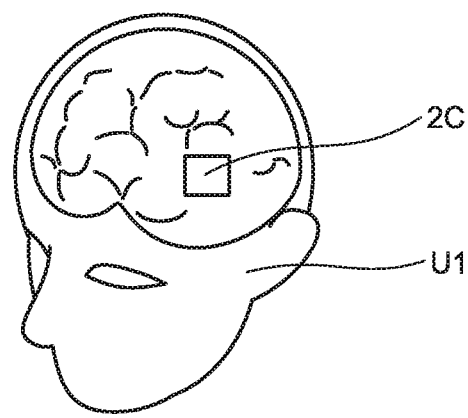
FIG. 21 is a diagram illustrating a schematic configuration of a wearable device according to a modification of the second and the third embodiments.
Figure 22:
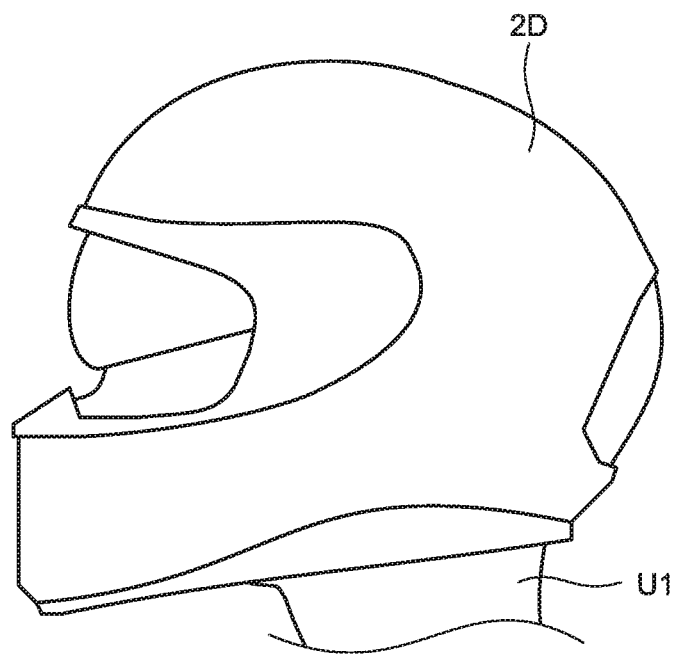
FIG. 22 is a diagram illustrating a schematic configuration of a wearable device according to a modification of the second and the third embodiments.

In the second and the third embodiments, the example using the eyewear-type wearable device 2 wearable by the driver has been described. However, the disclosure is not limited to this and can be applied to various wearable devices. For example, as illustrated in FIG. 19, the disclosure can also be applied to a contact lens type wearable device 2A having an image capturing function. Furthermore, the disclosure can also be applied to a wearable device 2B in FIG. 20 and can even be applied to a device that directly communicates with the brain of the driver U1 such as a brain chip type wearable device 2C as illustrated in FIG. 21. Furthermore, a helmet shaped configuration with a visor such as a wearable device 2D in FIG. 22 may be employed. In this case, the wearable device 2D may project and display an image on the visor.

Moreover, in the second and the third embodiments, an image is visually recognized with the wearable device 2 projecting the image onto the retina of the driver. Alternatively, for example, the image may be projected and displayed on a lens of an eyewear and the like.

In the first to the third embodiments, deep learning using a neural network has been described as an example of machine learning. Alternatively, machine learning based on other methods may be applied. For example, other supervised learning such as support vector machines, decision trees, simple Bayes, or k-nearest neighbors may be used. Furthermore, instead of supervised learning, semi-supervised learning may be used.

Further, in the first to third embodiments, data obtained by, for example, inter-vehicle communication or road-vehicle communication may be used as input parameters in addition to traveling data about a vehicle.

Furthermore, the "unit" described above in the first to third embodiments can be read as a "circuit" or the like. For example, the control unit can be read as a control circuit.

Further, the programs to be executed by the driving support device and the wearable device according to the first to third embodiments are file data of an installable format or an executable format, and are provided while being stored in computer-readable storage media such as a CD-ROM, flexible disk (FD), CD-R, Digital Versatile Disk (DVD), USB medium, flash memory and the like.

Furthermore, the program to be executed by the driving support device and the wearable device according to the first to third embodiments may be stored on a computer connected to a network such as the Internet and configured to be downloaded via the network to be provided.

In the description of the flowcharts in this specification, the anteroposterior relationship between steps in terms of processing is clearly indicated by using expressions such as "first", "after", and "next". However, the present order of the processing required for implementing the embodiments are not uniquely defined by these expressions. Thus, the order of processing in the flowcharts described herein can be changed without contradiction.

According to the disclosure, the driving support information is displayed right above the operation member, and thus the driver can intuitively recognize the driving support information.

According to the disclosure, the actual operation amount and the recommended operation amount are displayed right above the operation member, so that the driver can perform an operation while recognizing a difference between the actual operation amount and the recommended operation amount, and thus the driver can drive with improved driving technique while feeling driving pleasure.

According to the disclosure, the driving support information is displayed on the region on the driver's line of sight between the driver and the windshield of the vehicle, whereby the driver can feel the driving pleasure with safety during driving ensured.

According to the disclosure, the driving support information based on the behavior of the vehicle is displayed, so that the driver can drive while intuitively recognizing the behavior of the vehicle, and thus can drive with improved driving technique.

According to the disclosure, the driver can drive while intuitively recognizing the behavior of the vehicle, and thus can drive with improved driving technique.

According to the disclosure, the driver can check and intuitively recognize the behavior of the vehicle on the line of sight while driving, and thus can drive with improved driving technique.

According to the disclosure, the driving support information is displayed over the steering wheel, so that the driver can intuitively recognize the information with safety ensured.

According to the disclosure, the actual steering amount and the recommended steering amount are displayed over the steering wheel, so that the driver can perform an operation while recognizing a difference between the actual steering amount and the recommended steering amount, and thus can drive with improved driving technique while feeling driving pleasure.

According to the disclosure, the display content of the driving support information is controlled based on the operation level of the driver, whereby driving support suitable for the driver can be provided.

According to the disclosure, the driving support information for supporting the driving of the vehicle is displayed in the visual field including the driver's line of sight, and thus the driver does not change the visual field during driving, whereby an effect of ensuring safety during driving can be obtained.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A driving support device comprising:
a memory; and
a processor including hardware, the processor being configured to
acquire line-of-sight information about a line of sight of a driver seated in a driver's seat of a vehicle, and output driving support information for supporting driving of the vehicle on a steering wheel of the vehicle in a visual field of the driver based on the line-of-sight information, and output the driving support information onto a region, in the visual field, the region being immediately above an operation member provided in the vehicle and being in an orthogonal direction orthogonal to the operation member.

2. A driving support device comprising:
a memory; and
a processor including hardware, the processor being configured to
acquire line-of-sight information about a line of sight of a driver seated in a driver's seat of a vehicle,
output driving support information for supporting driving of the vehicle, onto a visual field of the driver based on the line-of-sight information,
output the driving support information onto a region, in the visual field, the region being immediately above an operation member provided in the vehicle and being in an orthogonal direction orthogonal to the operation member, and
acquire an operation amount on the operation member by the driver and vehicle speed of the vehicle,
input to a learned model obtained as a result of machine learning based on traveling data of a plurality of vehicles, an input parameter including the operation amount and the vehicle speed, and
output the driving support information including the operation amount and a recommended operation amount on the operation member, the recommended operation amount being an output parameter output from the learned model.

3. A driving support device comprising:
a memory; and
a processor including hardware, the processor being configured to
acquire line-of-sight information about a line of sight of a driver seated in a driver's seat of a vehicle, and
output driving support information for supporting driving of the vehicle on a steering wheel of the vehicle in a visual field of the driver based on the line-of-sight information, and
output the driving support information on a region on the line of sight of the driver between a windshield of the vehicle and the driver.

4. The driving support device according to claim 3, wherein
the processor is further configured to
acquire behavior information about a behavior of the vehicle,
generate the driving support information based on the behavior information, and
output the driving support information.

5. A driving support device comprising:
a memory; and
a processor including hardware, the processor being configured to
acquire line-of-sight information about a line of sight of a driver seated in a driver's seat of a vehicle,
output driving support information for supporting driving of the vehicle, onto a visual field of the driver based on the line-of-sight information,
output the driving support information on a region on the line of sight of the driver between a windshield of the vehicle and the driver,
acquire behavior information about a behavior of the vehicle,
generate the driving support information based on the behavior information,
output the driving support information, and
output the driving support information including a receptacle image having a recessed surface and a ball image that is virtually movable on the recessed surface in accordance with a change in gravitational acceleration in forward, backward, leftward, and rightward directions of the vehicle.

6. The driving support device according to claim 3, wherein
the processor is further configured to
acquire vehicle speed of the vehicle,
determine whether the vehicle is in a moving state based on the vehicle speed, and
output the driving support information on the line of sight of the driver when the vehicle is in the moving state.

7. The driving support device according to claim 4, wherein
the processor is further configured to
acquire vehicle speed of the vehicle,
determine whether the vehicle is in a moving state based on the vehicle speed, and
output the driving support information on the line of sight of the driver when the vehicle is in the moving state.

8. The driving support device according to claim 5, wherein
the processor is further configured to
acquire vehicle speed of the vehicle,
determine whether the vehicle is in a moving state based on the vehicle speed, and
output the driving support information on the line of sight of the driver when the vehicle is in the moving state.

9. The driving support device according to claim 1, wherein the processor is further configured to output the driving support information over the steering wheel of the vehicle, in the visual field.

10. A driving support device comprising:
a memory; and
a processor including hardware, the processor being configured to
acquire line-of-sight information about a line of sight of a driver seated in a driver's seat of a vehicle,
output driving support information for supporting driving of the vehicle, onto a visual field of the driver based on the line-of-sight information,
output the driving support information over a steering wheel of the vehicle, in the visual field,
acquire a steering amount of the steering wheel from a reference position and vehicle speed of the vehicle,
input to a learned model obtained as a result of machine learning based on traveling data about a plurality of vehicles, an input parameter including the steering amount and the vehicle speed, and
output the driving support information including the reference position, the steering amount, and a recommended steering amount for the steering wheel, the recommended steering amount being an output parameter output from the learned model.

11. The driving support device according to claim 1, wherein
the processor is further configured to
acquire an operation level serving as an index for an operation ability of the driver, and control a display content of the driving support information based on the operation level.

12. A driving support system comprising:
a driving support device including:
a memory; and
a processor including hardware, the processor being configured to
acquire line-of-sight information about a line of sight of a driver seated in a driver's seat of a vehicle, and
output driving support information for supporting driving of the vehicle on a steering wheel of the vehicle in a visual field of the driver based on the line-of-sight information; and
a wearable device configured to bidirectionally communicate with the driving support device, transmit light in a visual field, and virtually display an image on the visual field, wherein
the wearable device includes a line-of-sight sensor configured to detect line-of-sight information about a line of sight of a driver wearing the wearable device, and
the processor is configured to output the driving support information to the wearable device to cause the wearable device to output the driving support information on the steering wheel of the vehicle in the visual field of the driver based on the line-of-sight information that is detected by the line-of-sight sensor.

13. A driving support method performed by a driving support device, the method comprising:

acquiring line-of-sight information about a line of sight of a driver seated in a driver's seat of a vehicle;
outputting driving support information for supporting driving of the vehicle on a steering wheel of the vehicle in a visual field of the driver based on the line-of-sight information read from a memory; and
outputting the driving support information onto a region, in the visual field, the region being immediately above an operation member provided in the vehicle and being in an orthogonal direction orthogonal to the operation member.

14. A non-transitory computer-readable recording medium with an executable program stored thereon, the program causing a driving support device to execute
acquiring line-of-sight information about a line of sight of a driver seated in a driver's seat of a vehicle,
outputting driving support information for supporting driving of the vehicle on a steering wheel of the vehicle in a visual field of the driver based on the line-of-sight information; and
outputting the driving support information onto a region, in the visual field, the region being immediately above an operation member provided in the vehicle and being in an orthogonal direction orthogonal to the operation member.

* * * * *